(12) United States Patent
Yoshikuwa et al.

(10) Patent No.: US 7,424,829 B2
(45) Date of Patent: Sep. 16, 2008

(54) BIPOLAR OUTPUT TORQUE SENSOR

(75) Inventors: Yoshio Yoshikuwa, Tokyo (JP); Akihiko Imagi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 77 days.

(21) Appl. No.: 10/588,508

(22) PCT Filed: Feb. 17, 2005

(86) PCT No.: PCT/JP2005/002472

§ 371 (c)(1), (2), (4) Date: Aug. 4, 2006

(87) PCT Pub. No.: WO2005/090937

PCT Pub. Date: Sep. 29, 2005

(65) Prior Publication Data

US 2007/0157741 A1    Jul. 12, 2007

(30) Foreign Application Priority Data

Mar. 17, 2004  (JP) .............................. 2004-076594

(51) Int. Cl.
*G01L 3/02* (2006.01)
(52) U.S. Cl. ................................. 73/862.331
(58) Field of Classification Search ................................. 73/862.331–862.333
See application file for complete search history.

(56) References Cited

U.S. PATENT DOCUMENTS

| | | | |
|---|---|---|---|
| 4,724,710 A | 2/1988 | Murty | |
| 6,928,887 B2 * | 8/2005 | Nakane et al. | 73/862.331 |
| 6,928,888 B2 * | 8/2005 | Nakane et al. | 73/862.332 |
| 7,246,531 B2 * | 7/2007 | Nakane et al. | 73/862.332 |
| 2002/0189371 A1 | 12/2002 | Nakane et al. | |
| 2004/0011138 A1 | 1/2004 | Gandel et al. | |

FOREIGN PATENT DOCUMENTS

| | | |
|---|---|---|
| JP | 63 171333 | 7/1988 |
| JP | 2 129814 | 10/1990 |
| JP | 3 44528 | 2/1991 |
| JP | 3 48714 | 5/1991 |
| JP | 5 196520 | 8/1993 |

(Continued)

*Primary Examiner*—Max Noori
(74) *Attorney, Agent, or Firm*—Oblon, Spivak, McClelland, Maier & Neustadt, P.C.

(57) ABSTRACT

A torque sensor where a first rotary shaft and a second rotary shaft are disposed on a common axial line, with the first rotary shaft and the second rotary shaft being coupled together by a torsion bar, and which detects torsional torque applied between the first rotary shaft and the second rotary shaft, the torque sensor including: magnetic field generating means that generates a magnetic field in the radial direction around the common axial line; magnetic field varying means that varies, in response to the relative rotation between the first rotary shaft and the second rotary shaft, the direction and size of detected magnetic flux flowing along the common axial line from the magnetic field generating means; and a magnetic sensor that detects the detected magnetic flux, wherein the magnetic sensor generates an output signal whose polarity changes in response to the direction of the detected magnetic flux and whose size changes in response to the size of the detected magnetic flux.

16 Claims, 12 Drawing Sheets

FOREIGN PATENT DOCUMENTS

| | | |
|---|---|---|
| JP | 6 78956 | 10/1994 |
| JP | 2729319 | 3/1998 |
| JP | 2002 98506 | 4/2002 |
| JP | 02 071019 | 9/2002 |
| JP | 2002 310819 | 10/2002 |
| JP | 2003 104217 | 4/2003 |

* cited by examiner

FIG. 1
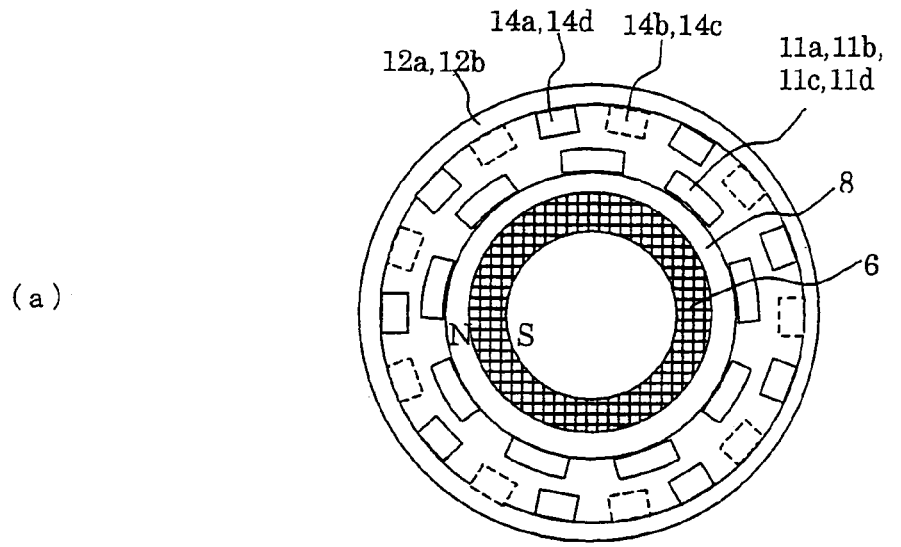
(a)
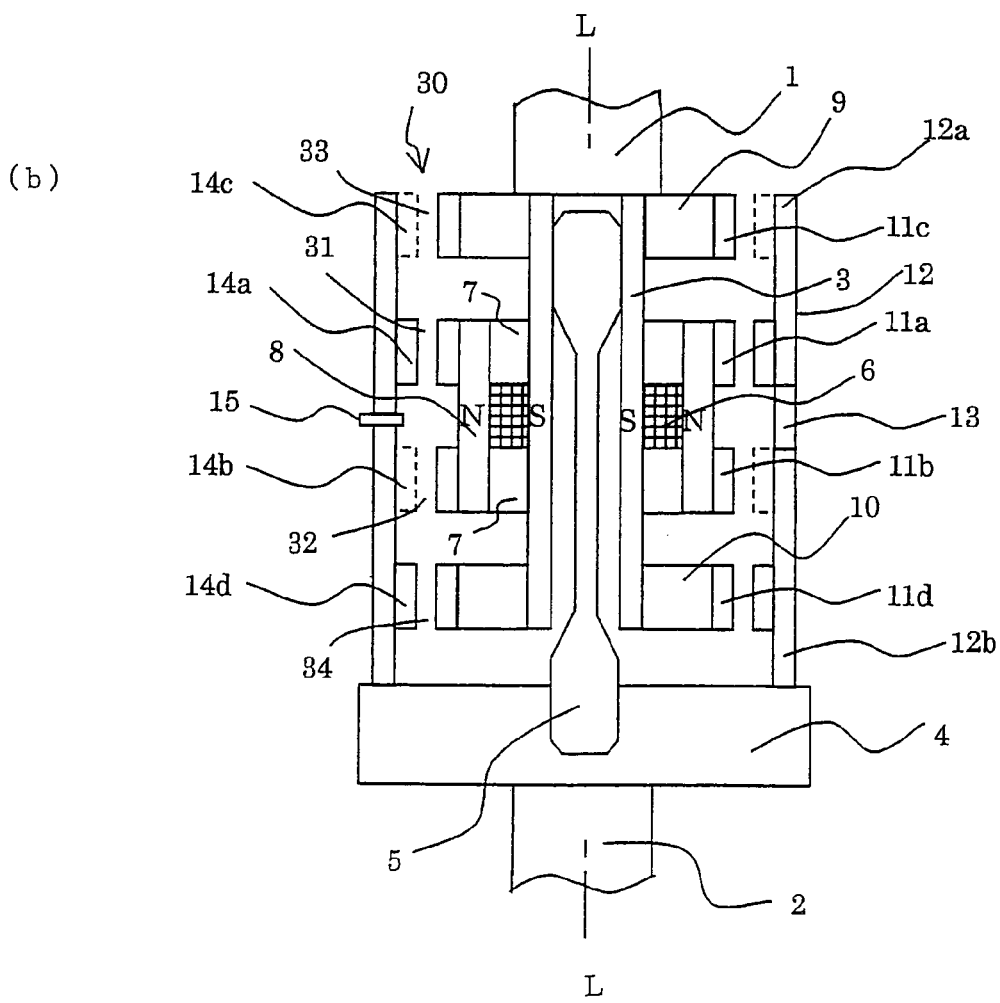
(b)

BIPOLAR OUTPUT TORQUE SENSOR

TECHNICAL FIELD

The present invention relates to a torque sensor that is used to detect the steering torque of an automobile, for example.

BACKGROUND ART

As a conventional torque sensor, the torque sensor disclosed in JP-A-2002-310819, for example, is known. This torque sensor includes two rings that oppose each other in an axial direction, and is configured such that concavo-convexities are formed on opposing peripheral surfaces of these rings, with these concavo-convexities opposing each other. Between the rings, a magnetic circuit is formed and a Hall element that detects magnetic flux passing through the magnetic circuit is disposed.

When the two rings relatively rotate in response to the size of the applied torsional torque, the state of opposition between the concavo-convexo surfaces of the rings changes, the magnetic resistance therebetween changes, and the output of the Hall element changes. For this reason, the size of the applied torque can be detected from the output of the Hall element.

Patent Document 1: JP-A-2002-310819

DISCLOSURE OF THE INVENTION

Problem that the Invention is to Solve

However, in this conventional torque sensor, when the center of the two rings shifts and becomes slanted due to manufacturing error, the magnetic resistance becomes different from that at the time of design. Thus, there has been the problem that the magnetic flux quantity changes and the sensor output value changes. Further, this conventional torque sensor is a unipolar type where the polarity of the sensor output is constant because the orientation of the magnetic flux passing through the Hall element is always constant, and there has been the problem that variations arise in the sensor output value due to manufacturing error in a state where the torque does not work, and it is difficult to correct this.

The present invention proposes an improved torque sensor that can address this problem.

Means for Solving the Problem

The torque sensor according to this invention is a torque sensor where a first rotary shaft and a second rotary shaft are disposed on a common axial line, with the first rotary shaft and the second rotary shaft being coupled together by a torsion bar, and which detects the torsional torque applied between the first rotary shaft and the second rotary shaft, the torque sensor comprising: magnetic field generating means that generates a magnetic field in the radial direction around the common axial line; magnetic field varying means that varies, in response to the relative rotation between the first rotary shaft and the second rotary shaft, the direction and magnitude of detected magnetic flux flowing along the common axial line from the magnetic field generating means; and a magnetic sensor means that detects the detected magnetic flux, wherein the magnetic sensor means generates an output signal whose polarity changes in response to the direction of the detected magnetic flux and whose magnitude changes in response to the magnitude of the detected magnetic flux.

Effects of the Invention

The torque sensor according to this invention uses the magnetic field generating means that generates a magnetic field in the radial direction of the common axial line, causes the direction and magnitude of the detected magnetic flux flowing along the common axial line to be varied by the magnetic field varying means in response to the relative rotation between the first rotary shaft and the second rotary shaft resulting from torsional torque, and detects the detected magnetic flux with the magnetic sensor means. By constructing the torque sensor in this manner, a bipolar output torque sensor can be obtained. Further, even if the first rotary shaft and the second rotary shaft become shifted or slanted in parallel due to manufacturing error or the like, affects with respect to the sensor output can be reduced.

BEST MODES FOR IMPLEMENTING THE INVENTION

Several embodiments of a torque sensor according to this invention will now be described below with reference to the drawings.

First Embodiment

FIG. 1 show a torque sensor according to a first embodiment of the invention. FIG. 1(a) is a front view, and FIG. 1(b) is a cross-sectional view. FIG. 1(a) is a front view where the torque sensor of the first embodiment is seen in an axial line direction, but some parts are omitted for ease of illustration. FIG. 1(b) is a cross-sectional view where the torque sensor of the first embodiment is cut along a plane including an axial line. FIG. 2 is a side view of the torque sensor according to the first embodiment.

The torque sensor of the first embodiment is disposed with a first rotary shaft 1, a second rotary shaft 2, an inner peripheral cylinder 3, a base plate 4, a torsion bar 5, magnetic field generating means 6, an outer peripheral cylinder 12, magnetic field varying means 30, and a magnetic sensor 15.

The torque sensor of this invention is a sensor that detects torsional torque working between the first rotary shaft 1 and the second rotary shaft 2. The first and second rotary shafts 1 and 2 are disposed such that they are rotatable on a common axial line L-L that is common to both. The inner peripheral cylinder 3, the base plate 4, the torsion bar 5, the magnetic field generating means 6, the outer peripheral cylinder 12 and the magnetic field varying means 30 are disposed between the first and second rotary shafts 1 and 2. The inner peripheral cylinder 3 is a circular cylinder disposed around the common axial line L-L, and is constructed by magnetic material such as iron material. One end of the inner peripheral cylinder 3 is connected to the first rotary shaft 1 such that the inner peripheral cylinder 3 rotates around the common axial line L-L together with the first rotary shaft 1.

The base plate 4 is a disc connected to one end of the second rotary shaft 2 such that the base plate 4 rotates around the common axial line L-L together with the second rotary shaft 2. The torsion bar 5 is disposed inside the inner peripheral cylinder 3 and extends along the common axial line L-L. One end of the torsion bar 5 is connected to the inner peripheral cylinder 3, and the other end of the torsion bar 5 is connected to the center portion of the base plate 4. As a result, the torsion bar 5 couples together the inner peripheral cylinder 3 and the base plate 4. The torsional rigidity of the inner peripheral cylinder 3 is sufficiently larger than the torsional rigidity of the torsion bar 5; thus, when torsional torque is applied between the first rotary shaft 1 and the second rotary shaft 2, the torsion bar 5 is twisted around the common axial line L-L in response to the size of the torque, and the first rotary shaft 1 and the second rotary shaft 2 relatively rotate around the common axial line L-L.

The outer peripheral cylinder 12 is a circular cylinder disposed such that it encircles the inner peripheral cylinder 3. The outer peripheral cylinder 12 is disposed around the common axial line L-L, and one end thereof is connected to the base plate 4 such that the outer peripheral cylinder 12 rotates around the common axial line L-L together with the base plate 4. The outer peripheral cylinder 12 is constructed by a first outer peripheral cylinder 12a, a second outer peripheral cylinder 12b, and a coupler 13 that couples together the outer peripheral cylinders 12a and 12b. The outer peripheral cylinders 12a and 12b are constructed by magnetic material such as iron material, and the coupler 13 is constructed by non-magnetic material such as aluminium. The coupler 13 is created in a substantially circular cylinder shape, but as shown in FIG. 2, the coupler 13 includes a space portion in part of its circular cylinder shape. Protruding portions 12c and 12d of the outer peripheral cylinders 12a and 12b oppose each other in the direction of the common axial line L-L in this space portion, and the magnetic sensor 15 is disposed between the protruding portions 12c and 12d. In this first embodiment, the magnetic sensor 15 is disposed such that it rotates together with the outer peripheral cylinder 12.

The magnetic field generating means 6 and the magnetic field varying means 30 are disposed between the inner peripheral cylinder 3 and the outer peripheral cylinder 12. In this first embodiment, the magnetic field generating means 6 is a ring-shaped permanent magnet and is disposed on the center portion of the outer periphery of the inner peripheral cylinder 3. The magnetic field generating means 6 is fitted into the outer peripheral surface of the inner peripheral cylinder 3, fixed to the inner peripheral cylinder 3, and rotates together with the inner peripheral cylinder 3. The magnetic field generating means 6 is magnetized in the radial direction of the common axial line L-L such that; for example, its inner peripheral side is an S pole and its outer peripheral side is an N pole.

An intermediate cylinder 8 is disposed on the outer periphery of the magnetic field generating means 6. The intermediate cylinder 8 is a circular cylinder disposed around the common axial line L-L, is constructed by magnetic material such as iron material, is fitted into the outer periphery of the magnetic field generating means 6, and rotates together with the inner peripheral cylinder 3. Non-magnetic spacer rings 7 and 7 are disposed on both the upper and lower sides of the magnetic field generating means 6. The spacer rings 7 and 7 are configured by non-magnetic material such as aluminium, cause the magnetic flux from the magnetic field generating means 6 to be efficiently concentrated in the radial direction, and apply the magnetic flux to the inner peripheral cylinder 3 and the intermediate cylinder 8. The non-magnetic spacer rings 7 and 7 are fitted between the inner peripheral cylinder 3 and the intermediate cylinder 8, and rotate around the common axial line L-L together with the inner peripheral cylinder 3.

The magnetic field varying means 30 is disposed together with the magnetic field generating means 6, the intermediate cylinder 8 and the spacer rings 7 and 7 between the inner peripheral cylinder 3 and the outer peripheral cylinder 12. The magnetic field varying means 30 includes a first magnetic field varying means 31, a second magnetic field varying means 32, a third magnetic field varying means 33, and a fourth magnetic field varying means 34. These magnetic field varying means 31 to 34 are disposed along the common axial line L-L. The first and second magnetic field varying means 31 and 32 are disposed on the outer periphery of the intermediate cylinder 8, with the first magnetic field varying means 31 being disposed on the upper end portion of the intermediate cylinder 8 and the second magnetic field varying means 32 being disposed on the lower end portion of the intermediate cylinder 8. The third and fourth magnetic field varying means 33 and 34 are disposed on the outer sides of the first and second magnetic field varying means 31 and 32, with the third magnetic field varying means 33 being disposed on the outer periphery of the upper end portion of the inner peripheral cylinder 3 and the fourth magnetic field varying means 34 being disposed on the outer periphery of the lower end portion of the inner peripheral cylinder 3.

The first to fourth magnetic field varying means 31, 32, 33 and 34 are constructed by plural protruding magnetic poles disposed around the common axial line L-L. The first magnetic field varying means 31 is constructed by an inner peripheral magnetic pole 11a disposed on the outer periphery of the intermediate cylinder 8 and by an outer peripheral magnetic pole 14a disposed on the inner periphery of the first outer peripheral cylinder 12a at the outer periphery of the inner peripheral magnetic pole 11a. These magnetic poles 11a and 14a are disposed at substantially the same position in the direction of the common axial line L-L, oppose each other via a space in the radial direction centered on the common axial line L-L, and vary the magnetic flux passing through the gap in response to changes in their state of opposition. The second magnetic field varying means 32 is constructed by an inner peripheral magnetic pole 11b disposed on the outer periphery of the intermediate cylinder 8 and by an outer peripheral magnetic pole 14b disposed on the inner periphery of the second outer peripheral cylinder 12b at the outer periphery of the inner peripheral magnetic pole 11b. These magnetic poles 11b and 14b are also disposed at substantially the same position in the direction of the common axial line L-L, oppose each other via a space in the radial direction centered on the common axial line L-L, and vary the magnetic flux passing through the gap in response to changes in their state of opposition.

The third magnetic field varying means 33 is constructed by an inner peripheral magnetic pole 11c disposed on the outer periphery of a ring-shaped iron core 9 fitted into the upper end portion of the inner peripheral cylinder 3 and by an outer peripheral magnetic pole 14c disposed on the inner periphery of the first outer peripheral cylinder 12a at the outer periphery of the inner peripheral magnetic pole 11c. These magnetic poles 11c and 14c are disposed at substantially the same position in the direction of the common axial line L-L, oppose each other via a space in the radial direction centered on the common axial line L-L, and vary the magnetic flux passing through the gap in response to changes in their state of opposition. The fourth magnetic field varying means 34 is constructed by an inner peripheral magnetic pole 11d disposed on the outer periphery of a ring-shaped iron core 10 fitted into the lower end portion of the inner peripheral cylinder 3 and by an outer peripheral magnetic pole 14d disposed on the inner periphery of the second outer peripheral cylinder 12b at the outer periphery of the inner peripheral magnetic pole 11d. These magnetic poles 11d and 14d are also disposed at substantially the same position in the direction of the common axial line L-L, oppose each other via a space in the radial direction centered on the common axial line L-L, and vary the magnetic flux passing through the gap in response to changes in their state of opposition.

The inner peripheral magnetic poles 11a and 11b disposed on the outer periphery of the intermediate cylinder 8 and the inner peripheral magnetic poles 11c and 11d disposed on the outer peripheries of the ring-shaped iron cores 9 and 10 include plural protruding magnetic poles disposed in phases that are mutually the same around the common axial line L-L. Specifically, these inner peripheral magnetic poles 11a to 11d have nine protruding magnetic poles disposed at angle intervals of 40°, and in regard to all of the inner peripheral magnetic poles 11a to 11d, these nine protruding magnetic poles are disposed in phases that are mutually the same at the angle positions of 0°, 40°, 80°, 120°, 160°, 200°, 240°, 280°, and 320°, for example, from inner peripheral magnetic pole reference positions around the common axial line L-L. In FIG. 1(a), these protruding poles of the inner peripheral magnetic poles 11a to lid are indicated by solid lines in a state where they are all superposed on each other in the direction of the common axial line L-L.

Of the outer peripheral magnetic poles 14a to 14d disposed on the inner periphery of the outer peripheral cylinder 12, the outer peripheral magnetic pole 14a of the first magnetic field varying means 31 and the outer peripheral magnetic pole 14d of the fourth magnetic field varying means 34 include plural magnetic poles disposed in phases that are mutually the same around the common axial line L-L. Specifically, these outer peripheral magnetic poles 14a and 14d also have nine protruding magnetic poles disposed at angle intervals of 40°, and in regard to the outer peripheral magnetic poles 14a and 14d, these nine protruding magnetic poles are disposed in phases that are mutually the same at the angle positions of 0°, 40°, 80°, 120°, 160°, 200°, 240°, 280°, and 320° from outer peripheral magnetic pole reference positions around the common axial line L-L. In FIG. 1(a), these protruding magnetic poles of the outer peripheral magnetic poles 14a and 14d are indicated by solid lines in a state where they are all superposed on each other in the direction of the common axial line L-L.

Of the outer peripheral magnetic poles 14a to 14d disposed on the inner periphery of the outer peripheral cylinder 12, the outer peripheral magnetic pole 14b of the second magnetic field varying means 32 and the outer peripheral magnetic pole 14c of the third magnetic field varying means 33 include plural magnetic poles disposed in phases that are mutually the same around the common axial line L-L. Specifically, these outer peripheral magnetic poles 14b and 14c also have nine protruding magnetic poles disposed at angle intervals of 40°, and in regard to the magnetic poles 14b and 14c, these nine protruding magnetic poles are disposed in phases that are mutually the same at the angle positions of 20°, 60°, 100°, 140°, 180°, 220°, 260°, 300°, and 340° from the outer peripheral magnetic pole reference positions around the common axial line L-L in phases that are exactly the opposite of those of the magnetic poles 11a to 11d. In FIG. 1(a), these protruding magnetic poles of the outer peripheral magnetic poles 14b and 14c are indicated by dotted lines in a state where they are all superposed on each other in the direction of the common axial line L-L.

The magnetic sensor 15 is a Hall element, for example, and generates an output signal corresponding to the direction and magnitude of the magnetic flux passing therethrough. A detected magnetic flux that flows along the common axial line L-L between the first outer peripheral cylinder 12a and the second outer peripheral cylinder 12b flows in this magnetic sensor 15. The output signal of the magnetic sensor 15 is one whose polarity is reversed between positive polarity and negative polarity in response to the direction of the detected magnetic flux passing through the magnetic sensor 15, and the magnitude of this output signal is proportional to the magnitude of the detected magnetic flux passing through the magnetic sensor 15.

It will be noted that in FIG. 1(a), the first and second rotary shafts 1 and 2, the inner peripheral cylinder 3, the torsion bar 5, and the base plate 4 are omitted for ease of illustration.

FIG. 3 show an origin position of the torque sensor of the first embodiment, with FIG. 3(a) being a front view that is the same as FIG. 1(a) in the origin position and FIG. 3(b) similarly being a cross-sectional view that is the same as FIG. 1(b) in the origin position. In the origin position of FIG. 3, in the first, second, third and fourth magnetic field varying means 31, 32, 33 and 34, the magnetic poles 11a, 11b, 11c and 11d are, as shown in FIG. 3(a), positioned at an angle position exactly in the middle of an angle position θa where the centers of the magnetic poles 14a and 14d indicated by solid lines are superposed and an angle position θb where the centers of the magnetic poles 14b and 14c indicated by dotted lines are superposed along the circumferential direction around the common axial line L-L.

In the origin position shown in FIG. 3(a), a magnetic flux 16a and a magnetic flux 16b shown in FIG. 3(b) flow. As shown in FIG. 3(b), the magnetic flux 16a passes through the magnetic poles 11a and 14a of the first magnetic field varying means 31 from the intermediate cylinder 8, reaches the first outer peripheral cylinder 12a, passes through the magnetic poles 14c and 11c of the third magnetic field varying means 33 from the first outer peripheral cylinder 12a, and flows to the inner peripheral cylinder 3 through the ring-shaped iron core 9. Further, as shown in FIG. 3(b), the magnetic flux 16b passes through the magnetic poles 11b and 14b of the second magnetic field varying means 32 from the intermediate cylinder 8, reaches the second outer peripheral cylinder 12b, passes through the magnetic poles 14d and 11d of the fourth magnetic field varying means 34 from the second outer peripheral cylinder 12b, and flows to the inner peripheral cylinder 3 through the ring-shaped iron core 10. Because the magnetic poles 11a, 11b, 11c and lid are, as shown in FIG. 3(a), positioned at an angle position exactly in the middle of the angle position θa where the centers of the magnetic poles 14a and 14d are superposed and the angle position θb where the centers of the magnetic poles 14b and 14c are superposed along the circumferential direction around the common axial line L-L, the magnetic resistances of the magnetic paths through which the magnetic flux 16a and the magnetic flux 16b flow are substantially equivalent to each other, and consequently the magnitudes of the magnetic fluxes 16a and 16b are substantially equivalent to each other. For this reason, the magnitude of the magnetic flux passing through the magnetic sensor 15 between the first outer peripheral cylinder 12a and the second outer peripheral cylinder 12b becomes substantially 0, and the signal output of the magnetic sensor 15 also becomes 0.

FIG. 4 show a first torque range where the first rotary shaft 1 has rotated in the counter-clockwise direction relative to the second rotary shaft 2 from the origin position of FIG. 3 and where the magnetic poles 11a, 11b, 11c and 11d have been displaced to a rotation angle close to the angle position θa where the centers of the magnetic poles 14a and 14d are superposed. In this first torque range, the magnetic poles 11a, 11b, 11c and 11d have moved away from the angle position θb where the magnetic poles 14b and 14c are superposed, and are in a range close to the angle position θa where the magnetic poles 14a and 14d are superposed. FIG. 4(a) is a front view that is the same as FIG. 1(a) in this first torque range, and FIG. 4(b) is similarly a cross-sectional view that is the same as FIG. 1(b) in the first torque range.

In the first torque range shown in FIG. 4, the size of the magnetic flux passing through the first and fourth magnetic field varying means 31 and 34 increases because the area of opposition between the magnetic poles 11a and 14a of the first magnetic field varying means 31 and the magnetic poles 11d and 14d of the fourth magnetic field varying means 34 increases, and conversely, the size of the magnetic flux passing through the second and third magnetic field varying means 32 and 33 decreases because the area of opposition between the magnetic poles 11b and 14b of the second magnetic field varying means 32 and the magnetic poles 11c and 14c of the third magnetic field varying means 33 decreases. For this reason, in the first torque range shown in FIG. 4, the magnetic fluxes 16a and 16b decrease and a new first detected magnetic flux 16c flows, as shown in FIG. 4(b). This first detected magnetic flux 16c passes through the magnetic poles 11a and 14a of the first magnetic field varying means 31 from the intermediate cylinder 8, reaches the first outer peripheral cylinder 12a, passes through the magnetic sensor 15 along the common axial line L-L from the first outer peripheral cylinder 12a, reaches the second outer peripheral cylinder 12b, and reaches the inner peripheral cylinder 3 through the ring-shaped iron core 10. The magnetic sensor 15 detects the magnetic flux flowing from the first outer peripheral cylinder 12a toward the second outer peripheral cylinder 12b in FIG. 2 on the basis of the first detected magnetic flux 16c flowing along the common axial line L-L, and generates a signal output with positive polarity, for example. This signal output with positive polarity is obtained in the first torque range, i.e., the range where the magnetic flux passing through the first and fourth magnetic field varying means 31 and 34 increases and where the magnetic flux passing through the second and third magnetic field varying means 32 and 33 decreases. The magnitude of this output signal increases in response to an increase in the torsional torque applied between the first and second rotary shafts 1 and 2 in this first torque range.

In a second torque range, where the first rotary shaft 1 rotates from the origin position shown in FIG. 3 relative to the second rotary shaft 2 in the clockwise direction that is the opposite direction of the first torque range shown in FIG. 4 and where the magnetic poles 11a, 11b, 11c and 11d are displaced to an angle position close to the angle position θb where the centers of the magnetic poles 14b and 14c are superposed, the torsional torque applied between the first and second rotary shafts 1 and 2 is in the opposite direction with respect to the first torque range. In this second torque range, the magnetic poles 11a, 11b, 11c and 11d move further away from the angle position θa where the center of the magnetic poles 14a and 14d are superposed than the origin position shown in FIG. 3 and move nearer to the angle position θb where the centers of the magnetic poles 14b and 14c are superposed.

In this second torque range, because the area of opposition between the magnetic poles 11b and 14b of the second magnetic field varying means 32 and the magnetic poles 11c and 14c of the third magnetic field varying means 33 increases, the magnitude of the magnetic flux passing through the second and third magnetic field varying means 32 and 33 increases, and conversely, because the area of opposition between the magnetic poles 11a and 14a of the first magnetic field varying means 31 and the magnetic poles 11d and 14d of the fourth magnetic field varying means 34 decreases, the magnitude of the magnetic flux passing through the first and fourth magnetic field varying means 31 and 34 decreases. For this reason, in the second torque range, the magnetic fluxes 16a and 16b decrease, and a new second detected magnetic flux flows. The second detected magnetic flux in the second torque range passes through the magnetic poles 11b and 14b of the second magnetic field varying means 32 from the intermediate cylinder 8, reaches the second outer peripheral cylinder 12b, passes through the magnetic sensor 15 along the common axial line L-L from the second outer peripheral cylinder 12b, reaches the first outer peripheral cylinder 12a, and reaches the inner peripheral cylinder 3 through the ring-shaped iron core 9. The magnetic sensor 15 detects the magnetic flux flowing from the second outer peripheral cylinder 12b toward the first outer peripheral cylinder 12a in FIG. 2 on the basis of the second detected magnetic flux, and generates a signal output with negative polarity, for example. This signal output with negative polarity is obtained in the second torque range, i.e., the range where the magnetic flux passing through the second and third magnetic field varying means 32 and 33 increases and where the magnetic flux passing through the first and fourth magnetic field varying means 31 and 34 decreases. The magnitude of this output signal increases in response to a decrease in the opposite-direction torsional torque applied between the first and second rotary shafts 1 and 2 in this second torque range.

In the torque sensor, it is ensured that relative rotation of ±10° for example, or in other words 20°, occurs between the rotary shafts 1 and 2, and changes in the torsional torque in that angle range, i.e., the relative rotation between the rotary shafts 1 and 2 is detected. Given that this relative rotation range of 20° is called the detection range, in the first embodiment, this detection range is set such that the origin position shown in FIG. 3 corresponds to the middle of the detection range and such that it changes substantially linearly from the first angle position, where the output signal of the magnetic sensor 15 reaches a maximum with negative polarity in the second torque range, to the second angle position, where the output signal of the magnetic sensor 15 reaches a maximum with positive polarity in the first torque range. Specifically, in the first embodiment, because the angle between the angle positions θa and θb is 20° and the origin position is set in the middle thereof, the detection range is set between the first angle position 10° closer to the angle position θb from the origin position and the second angle position 10° closer to the angle position θa from the origin position. The first angle position is in the second torque range, and the output signal of the magnetic sensor 15 reaches a maximum with negative polarity at this first angle position. The second angle position is in the first torque range, and the output signal of the magnetic sensor 15 reaches a maximum with positive polarity at this second angle position.

In this manner, in the first embodiment, an output signal whose polarity reverses and whose magnitude increases substantially linearly in accompaniment with an increase in the applied torsional torque is obtained from the magnetic sensor 15 in the detection range, and as a result, a bipolar output torque sensor can be realized. This bipolar output torque sensor includes an origin position where the polarity reverses, and correction of variations in the sensor output value at this origin point is easy.

A case will now be described where the first rotary shaft 1 and the second rotary shaft 2 have shifted due to manufacturing error. FIG. 5 is a cross-sectional view that is perpendicular to the common axial line L-L and includes the inner peripheral magnetic poles 11a and the outer peripheral magnetic poles 14a, and shows a state where the first rotary shaft 1 has shifted in parallel to the upper side of the page with respect to the second rotary shaft 2, i.e., an eccentric state. In this cross section, magnetic fluxes 16d, 16e, 16f, 16g, 16h, 16i, 16j, 16k and 16l flow in the radial direction from the nine inner peripheral magnetic poles 11a to the nine outer peripheral magnetic poles 14a. In this case, the magnetic resistances are different because there are variations in the lengths of the spaces between the inner peripheral magnetic poles 11a and the outer peripheral magnetic poles 14a. Consequently, variations arise in the magnetic fluxes in the radial direction due to the magnetomotive force of the permanent magnet 6. For example, the magnetic fluxes 16d and 16e where the lengths of the spaces are small become large, and the magnetic fluxes 16h and 16i where the lengths of the spaces are large become small. However, because the magnetic flux passing through the magnetic sensor 15 in the axial direction along the common axial line L-L is dependent on the sum of all of the magnetic fluxes 16d, 16e, 16f, 16g, 16h, 16i, 16j, 16k and 16l, any affects resulting from eccentricity between the first rotary shaft 1 and the second rotary shaft 2 become small.

FIG. 6 shows part of a cross-sectional view in a plane including the common axial line L-L in regard to a state where the first rotary shaft 1 and the second rotary shaft 2 are slanted. Because the magnetic poles of the ring-shaped permanent magnet 6 are such that the outer periphery is an N pole and the inner periphery is an S pole, the direction of the magnetic flux is as like magnetic fluxes 16m, 16n, 16o, 16p, 16q, 16r, 16s and 16t shown in FIG. 6. In a state where the axis is slanted as in FIG. 6, the magnetic fluxes 16m and 16t where the lengths of the spaces are small are the largest, and the magnetic fluxes 16p and 16q where the lengths of the spaces are large are the smallest. However, because the magnetic flux passing through the magnetic sensor 15 in the axial direction along the common axial line L-L is dependent on the difference between the sum of the magnetic fluxes 16m, 16n, 16q and 16r and the sum of the magnetic fluxes 16o, 16p, 16s and 16t, the affect of the slanting of the first rotary shaft 1 and the second rotary shaft 2 becomes small.

In this manner, the torque sensor of the first embodiment is characterized in that it is a torque sensor where a first rotary shaft 1 and a second rotary shaft 2 are disposed on a common axial line L-L, with the first rotary shaft 1 and the second rotary shaft 2 being coupled together by a torsion bar 5, and which detects the torsional torque applied between the first rotary shaft 1 and the second rotary shaft 2, the torque sensor comprising: magnetic field generating means 6 that generates a magnetic field in the radial direction of the common axial line L-L; magnetic field varying means 30 that varies the direction and magnitude of detected magnetic flux flowing along the common axial line from the magnetic field generating means 6 in response to the relative rotation between the first rotary shaft 1 and the second rotary shaft 2; and a magnetic sensor 15 that detects the detected magnetic flux, wherein the magnetic sensor 15 generates an output signal whose polarity changes in response to the direction of the detected magnetic flux and whose magnitude changes in response to the magnitude of the detected magnetic flux. On the basis of this characteristic, a bipolar output signal where the polarity of the output signal of the magnetic sensor 15 reverses can be obtained, and according to this torque sensor, error and variations in the signal at the polarity reversing position can be easily corrected. Further, even when the central axis of the first rotary shaft 1 and the second rotary shaft 2 become shifted and eccentric due to manufacturing error, or when the central axis of the first rotary shaft 1 and the second rotary shaft 2 become slanted diagonally, the imparting of substantial changes to the detected magnetic flux passing through the magnetic sensor 15 can be lessened, and a torque sensor where the affects of manufacturing error are small can be realized.

It will be noted that a solid shaft can be used instead of the inner peripheral cylinder 3, and the torsion bar 5 can be disposed at a separate position such that it couples together the rotary shafts 1 and 2. Further, any material, such as aluminium or resin material, may be used for the material of the non-magnetic spacer rings 7 and the non-magnetic coupler 13 as long as the permanent magnet 6, which is the magnetic field generating means, or a magnetic body can be disposed. Further, instead of the inner peripheral magnetic poles 11a, 11b, 11c and 11d and the outer peripheral magnetic poles 14a, 14b, 14c and 14d, notches or holes may be disposed in the outer peripheral surface of the intermediate cylinder 8 and the inner peripheral surfaces of the outer peripheral cylinders 12a and 12b so that the magnetic resistances change.

Second Embodiment

FIG. 7 is a cross-sectional view showing a torque sensor according to a second embodiment of this invention. FIG. 7 shows, in regard to the second embodiment, a cross-sectional view resulting from the plane including the common axial line L-L that is the same as FIG. 1(b). In this second embodiment, two radially oriented ring-shaped permanent magnets 6 magnetized in the radial direction are used, and these two permanent magnets 6 are disposed between the inner peripheral magnetic poles 11a and 11b and the inner peripheral cylinder 3. The remaining construction is the same as that of the first embodiment, and action and effects that are the same as those of the first embodiment are also obtained by this second embodiment.

It will be noted that it suffices for the two permanent magnets 6 in the second embodiment to be constructed such that the magnetic flux emerges in the radial direction. Further, the two permanent magnets 6 shown in FIG. 7 may also be put together to form a single cylindrical permanent magnet.

Third Embodiment

FIG. 8 is a cross-sectional view showing a torque sensor according to a third embodiment of this invention. FIG. 8 shows, in regard to the third embodiment, a cross-sectional view resulting from a plane perpendicular to the common axial line L-L. In this third embodiment, plural plate-shaped or circular plate-shaped permanent magnet plates 17 are used instead of the radially oriented ring-shaped permanent magnet 6 in the first embodiment. Specifically, nine permanent magnet plates 17 magnetized in the radial direction are disposed at inner peripheral positions of the inner peripheral magnetic poles 11a and 11b. These permanent magnetic plates 17 are disposed inside the intermediate cylinder 8 configured by magnetic material such as iron. The remaining construction is the same as that of the first embodiment.

In this third embodiment also, effects that are the same as those of the first embodiment are obtained because the magnetic fluxes resulting from the permanent magnet plates 17 are in the radial direction in the cross section of FIG. 8. Further, in the third embodiment, nine of the permanent magnet plates 17 are used, but the number of the permanent magnet plates 17 may be reduced because magnetic fluxes expand due to the intermediate cylinder 8.

In this manner, a low-cost torque sensor can be realized by using the plural plate-shaped or circular plate-shaped permanent magnet plates 17.

Fourth Embodiment

In the torque sensor of this invention, the direction and size of the detected magnetic flux flowing along the common axial line L-L change due to the relative rotation between the first rotary shaft 1 and the second rotary shaft 2. As the magnetic field varying means 30 that varies the direction and size of the detected magnetic flux flowing in the direction of the common axial line L-L, the inner peripheral magnetic poles 11*a*, 11*b*, 11*c* and 1*id* and the outer peripheral magnetic poles 14*a*, 14*b*, 14*c* and 14*d* were employed in the first embodiment, but another magnetic field varying means may also be used.

FIG. 9 are a front view and cross-sectional views showing a torque sensor according to a fourth embodiment of this invention. FIG. 9(*a*) is a front view in the direction of the common axial line L-L that is the same as FIG. 1(*a*), FIG. 9(*b*) shows part of the same cross-sectional view as FIG. 1(*b*) in a plane including the common axial line L-L, and FIG. 9(*c*) is a view showing the relationship between the inner peripheral magnetic poles 11*a*, 11*b*, 11*c* and 11*d* and beveled magnetic pole plates 18*a* and 18*b*, and shows a view where the magnetic poles 11*a* to 11*d* and the beveled magnetic pole plates 18*a* and 18*b* are projected onto a plane parallel to the common axial line L-L.

In the fourth embodiment of FIG. 9, five plate-shaped or circular plate-shaped permanent magnetic plates 17 are used on the inner periphery of the intermediate cylinder 8 to generate magnetomotive force in the radial direction. In this fourth embodiment, the inner peripheral magnetic poles 11*a*, 11*b*, 11*c* and 11*d* of the four magnetic field varying means 31, 32, 33 and 34 are configured by five protruding magnetic poles disposed in phases that are mutually the same at angle intervals of 72°. Further, in this fourth embodiment, five first beveled magnetic pole plates 18*a* are used instead of the outer peripheral magnetic poles 14*a* and 14*c* of the first embodiment, and five second beveled magnetic pole plates 18*b* are used instead of the outer peripheral magnetic poles 14*b* and 14*d*.

The five first beveled magnetic pole plates 18*a* are arranged in the circumferential direction on the same circumference around the common axial line L-L, and are disposed within angle ranges of 72° where the inner peripheral surface of the first outer peripheral cylinder 12*a* is divided equally into five parts. The five first beveled magnetic pole plates 18*a* correspond to the protruding magnetic poles of the inner peripheral magnetic poles 11*a* and 11*c* disposed at angle intervals of 72°. The first beveled magnetic pole plates 18*a* extend in a direction slanted a predetermined angle á with respect to the common axial line L-L in the angle range of 72°, as shown in FIG. 9(*c*), and oppose the protruding magnetic poles of the inner peripheral magnetic poles 11*a* and 11*c*. When the first beveled magnetic pole plates 18*a* rotate around the common axial line L-L, the area of opposition between them and the protruding magnetic poles of the inner peripheral magnetic poles 11*a* and 11*c* changes.

The five second beveled magnetic pole plates 18*b* are arranged in the circumferential direction on the same circumference around the common axial line L-L, and are disposed within an angle range of 72° where the inner peripheral surface of the second outer peripheral cylinder 12*b* is divided equally into five parts. The five second beveled magnetic pole plates 18*b* correspond to the protruding magnetic poles of the inner peripheral magnetic poles 11*b* and 11*d* disposed at angle intervals of 72°. The second beveled magnetic pole plates 18*b* extend in a direction slanted a predetermined angle á with respect to the common axial line L-L in the angle range of 72°, as shown in FIG. 9(*c*), and oppose the protruding magnetic poles of the inner peripheral magnetic poles 11*b* and 11*d*. When the second beveled magnetic pole plates 18*b* rotate around the common axial line L-L, the area of opposition between them and the protruding magnetic poles of the inner peripheral magnetic poles 11*b* and 11*d* also changes.

In the state of FIG. 9(*c*), for example, the area where the first and second beveled magnetic pole plates 18*a* and 18*b* face the inner peripheral magnetic poles 11*a* and 11*d* is large, and the area where the first and second slanted magnetic pole plates 18*a* and 18*b* face the inner peripheral magnetic poles 11*b* and 11*c* is small. Consequently, the magnetic resistance between the first beveled magnetic pole plates 18*a* and the inner peripheral magnetic poles 11*a* and the magnetic resistance between the second beveled magnetic pole pates 18*b* and the inner peripheral magnetic poles 1*id* are small, and conversely, the magnetic resistance between the first beveled magnetic pole plates 18*a* and the inner peripheral magnetic poles 11*c* and the magnetic resistance between the second beveled magnetic pole plates 18*b* and the inner peripheral magnetic poles 1*id* are large. In this case, the principal magnetic fluxes become like the magnetic fluxes 16*a*, 16*b* and 16*c* shown in FIG. 9(*b*), and the detected magnetic flux 16*c* flowing through the magnetic sensor 15 in the axial direction along the common axial line L-L is present. The detected magnetic flux 16*c* passes through the magnetic poles 11*a* and the first slanted magnetic pole plates 18*a* from the intermediate cylinder 8, reaches the first outer peripheral cylinder 12*a*, passes through the magnetic sensor 15 along the common axial line L-L from the first outer peripheral cylinder 12*a*, and reaches the intermediate cylinder 8 through the second outer peripheral cylinder 12*b*, the second beveled magnetic pole plates 18*b* and the inner peripheral magnetic poles 11*d*, and flows in the direction of the second outer peripheral cylinder 12*b* from the first outer peripheral cylinder 12*a* with respect to the magnetic sensor 15. The magnitude of this detected magnetic flux 16*c* is proportional to the relative rotation angle of the rotary shafts 1 and 2, i.e., to the relative rotation angle between the first and second beveled magnetic pole plates 18*a* and 18*b* and the inner peripheral magnetic poles 11*a* to 11*d*.

When the first and second beveled magnetic pole plates 18*a* and 18*b* further rotate and the area where the first and second beveled magnetic pole plates 18*a* and 18*b* face the inner peripheral magnetic poles 11*a* and 1*id* decreases and conversely the area where the first and second beveled magnetic pole plates 18*a* and 18*b* face the inner peripheral magnetic poles 11*b* and 11*c* increases, the detected magnetic flux flows in the axial direction along the common axial line L-L from the second outer peripheral cylinder 12*b* toward the first outer peripheral cylinder 12*a*, and the direction of the magnetic flux flowing to the magnetic sensor 15 is reversed. For this reason, because the direction of the detected magnetic flux is reversed in accompaniment with the rotation of the first and second beveled magnetic pole plates 18*a* and 18*b*, the polarity of the output signal of the magnetic sensor 15 is reversed. The magnitude of the detected magnetic flux after this polarity reversal is also proportional to the relative rotation angle between the rotary shafts 1 and 2, i.e., to the relative rotation angle between the first and second beveled magnetic pole plates 18*a* and 18*b* and the inner peripheral magnetic poles 11*a* to 11*d*.

In this manner, in the fourth embodiment, the beveled magnetic pole plates 18*a* and 18*b* are used, whereby the area where the beveled magnetic pole plates 18*a* and 18*b* and the inner peripheral magnetic poles 11*a* to 11*d* face each other changes in response to the relative rotation angle between the first rotary shaft 1 and the second rotary shaft 2, and the torque can be detected while reversing the polarity of the output signal of the magnetic sensor 15. It will be noted that the beveled magnetic pole plates 18*a* and 18*b* can be constructed by a pair of plates, or as stepped beveled magnetic pole plates where the positions of plural magnetic thin plates are shifted.

Fifth Embodiment

FIG. 10 are a cross-sectional view and a side view showing a torque sensor according to a fifth embodiment of this invention. FIG. 10(a) is a cross-sectional view resulting from a plane including the common axial line L-L in the same manner as FIG. 1(b), and FIG. 10(b) is a side view that is the same as FIG. 2. In this fifth embodiment, the first outer peripheral cylinder 12a at the first rotary shaft 1 side and the second outer peripheral cylinder 12b at the second rotary shaft 2 side are coupled together by the non-magnetic coupler 13. This coupler 13 is constructed in a circular cylinder shape, and as shown in FIG. 10(a), couples together the outer peripheral cylinders 12a and 12b at the inner peripheral surface sides of their opposing end portions. When the second rotary shaft 2 rotates, the outer peripheral cylinders 12a and 12b rotate integrally with the coupler 13.

The magnetic sensor 15 is disposed on the outer periphery of the coupler 13 between the first outer peripheral cylinder 12a and the second outer peripheral cylinder 12b. Fixed magnetic poles 19a and 19b configured by magnetic material such as iron material are disposed on both sides of the magnetic sensor 15. These fixed magnetic poles 19a and 19b oppose the outer peripheral cylinders 12a and 12b via small spatial lengths such that the fixed magnetic poles 19a and 19b do not contact the outer peripheral cylinders 12a and 12b. These fixed magnetic poles 19a and 19b and the magnetic sensor 15 are fixed with respect to an absolute space that does not move. The remaining construction is the same as that of the first embodiment.

In this fifth embodiment, because the fixed magnetic poles 19a and 19b and the magnetic sensor 15 are fixed in an absolute space that does not move, a detection use cable from the magnetic sensor 15 does not become tangled even when the second rotary shaft 2 rotates, and the durability of the magnetic sensor 15 is also improved. When torsional torque works between the first rotary shaft 1 and the second rotary shaft 2 and the relative angle changes, a detected magnetic flux flows between the outer peripheral cylinders 12a and 12b, but the detected magnetic flux flows in the direction of the common axial line, passes through the fixed magnetic poles 19a and 19b, and flows through the magnetic sensor 15. Because the direction and magnitude of the detected magnetic flux flowing through the magnetic sensor 15 change in response to the relative rotation angle between the rotary shafts 1 and 2 in the same manner as in the first embodiment, a bipolar output signal can be obtained from the magnetic sensor 15 in the same manner as in the first embodiment, and the torsional torque can be measured by detecting the output value of the magnetic sensor 15.

Sixth Embodiment

FIG. 11 are a cross-sectional view and a side view showing a torque sensor according to a sixth embodiment of this invention. FIG. 11(a) is a cross-sectional view resulting from a plane including the common axial line L-L in the same manner as FIG. 1(b), and FIG. 11(b) is a side view that is the same as FIG. 2. In this sixth embodiment, the coupler 13 has a circular cylinder shape with substantially the same radius as the radii of the outer peripheral cylinders 12a and 12b, as shown in FIGS. 11(a) and 11(b). When the second rotary shaft 2 rotates, the first outer peripheral cylinder 12a at the first rotary shaft 1 side and the second outer peripheral cylinder 12b at the second rotary shaft 2 side rotate integrally with the non-magnetic coupler 13.

The magnetic sensor 15 is disposed on the outer periphery of the coupler 13. Fixed magnetic poles 19a and 19b configured by magnetic material such as iron material are added to the magnetic sensor 15. The fixed magnetic pole 19a opposes, via a small space, the outer peripheral surface of the end portion of the first outer peripheral cylinder 12a that opposes the second outer peripheral cylinder 12b, and the fixed magnetic pole 19b opposes, via a small space, the outer peripheral surface of the end portion of the second outer peripheral cylinder 12b that opposes the first outer peripheral cylinder 12a. These fixed magnetic poles 19a and 19b and the magnetic sensor 15 are fixed in an absolute space that does not move. The remaining construction is the same as that of the first embodiment.

When torsional torque works between the first rotary shaft 1 and the second rotary shaft 2 and the relative angle changes, a detected magnetic flux flows between the outer peripheral cylinders 12a and 12b in the direction of the common axial line, but the detected magnetic flux flows to the magnetic sensor 15 via the fixed magnetic poles 19a and 19b. Because the direction and magnitude of the detected magnetic flux flowing through the magnetic sensor 15 change in response to the relative rotation angle between the rotary shafts 1 and 2 in the same manner as in the first embodiment, a bipolar output signal can be obtained from the magnetic sensor 15 in the same manner as in the first embodiment, and the torsional torque can be measured by detecting the output value of the magnetic sensor 15.

In this sixth embodiment also, the magnetic sensor 15 and the fixed magnetic poles 19a and 19b are fixed with respect to an absolute space that does not move, whereby the sensor detection-use cable does not become tangled even when the second rotary shaft 2 rotates, and the durability of the magnetic sensor 15 is also improved.

Seventh Embodiment

FIG. 12 are a cross-sectional view and a side view showing a torque sensor according to a seventh embodiment of this invention. FIG. 12(a) is a cross-sectional view resulting from a plane including the common axial line L-L in the same manner as FIG. 1(b), and FIG. 12(b) is a side view that is the same as FIG. 2. This seventh embodiment is characterized in that plural magnetic sensors are disposed, and in FIG. 12, two magnetic sensors 15a and 15b are disposed. The remaining construction is the same as that of the first embodiment.

When the torque sensor of this invention is in use, there is the potential for the magnetic sensor 15 to fail. Thus, by using the plural magnetic sensors 15a and 15b and making the design redundant, safety is improved. Similar to the magnetic sensor 15 of the first embodiment, the magnetic sensors 15a and 15b are disposed in space portions disposed in the coupler 13.

When, for example, the first outer peripheral cylinder 12a at the first rotary shaft 1 side and the second outer peripheral cylinder 12b at the second rotary 2 side are slantingly disposed, error arises in the length of the space between the outer peripheral cylinders 12a and 12b and the magnetic sensor 15, but by using the plural magnetic sensors 15a and 15b and averaging the outputs of their output signals, as in this seventh embodiment, the affects of manufacturing error can be alleviated. Further, by using plural magnetic sensors 15a and 15b having different sensitivities, a wide measurement range can be detected with high sensitivity.

In this manner, by using the plural magnetic sensors 15a and 15b, safety can be improved, the affects of manufacturing error can be alleviated, and a wide measurement range can be detected with high sensitivity.

Eighth Embodiment

FIG. 13 is a side view showing a torque sensor according to an eighth embodiment of this invention. The first outer peripheral cylinder 12a at the first rotary shaft 1 side and the second outer peripheral cylinder 12b at the second rotary shaft 2 side are coupled together by the non-magnetic coupler 13 and rotate integrally. Further, plural magnetic sensors 15a and 15b are disposed. The magnetic sensor 15a is fixed with respect to an absolute space that does not move together with the fixed magnetic poles 19a and 19b, and the magnetic sensor 15b is fixed with respect to an absolute space that does not move together with the fixed magnetic poles 19c and 19d.

As shown in FIG. 13, concavo-convexo shapes 23 are formed on an end surface 22 of the first outer peripheral cylinder 12a at the coupler 13 side. The concavo-convexo shapes 23 comprise concave portions and convex portions that are alternately formed at predetermined intervals in the circumferential direction of the end surface 22, and the heights of the concave portions and the convex portions are all uniform. The fixed magnetic pole 19a of the magnetic sensor 15a and the fixed magnetic pole 19c of the magnetic sensor 15b oppose the concavo-convexo shapes 23 via small spaces, but their states of opposition are set such that they have mutually opposite phases with respect to the concavo-convexo shapes 23. Specifically, the states of opposition are set such that when the fixed magnetic pole 19a of the magnetic sensor 15a opposes a convex portion of the concavo-convexo shapes 23, the fixed magnetic pole 19c of the magnetic sensor 15b opposes a concave portion. And when the fixed magnetic pole 19a of the magnetic sensor 15a opposes a concave portion of the concavo-convexo shapes, the fixed magnetic pole 19c of the magnetic sensor 15b opposes a convex portion. FIG. 13 shows a state where the fixed magnetic pole 19a of the magnetic sensor 15a opposes a convex portion of the concavo-convexo shapes, and where the fixed magnetic pole 19c of the magnetic sensor 15b opposes a concave portion. The remaining construction is the same as that of the first embodiment.

FIG. 14 shows the sensor output waveforms when the torque is increased while the torque sensor according to this eighth embodiment is rotated. The horizontal axis in FIG. 14 represents time, and the vertical axis represents the output signals of the magnetic sensors. The output waveform of the magnetic sensor 15a shows a sinusoidal or substantially sinusoidal change together with the elapse of time, as indicated by the solid-line waveform 20a, but the average magnitude thereof increases in accompaniment with an increase in the torque. The increase in the torque is dependent on the fact that the magnitude of the detected magnetic flux passing through the magnetic sensor 15a linearly increases in accompaniment with an increase in the torque in the detection range between the angle positions θa and θb described in the first embodiment. The sinusoidal change in the output waveform 20a is dependent on the change in the portion where the fixed magnetic pole 19a of the magnetic sensor 15a opposes the concavo-convexo shapes of the first outer peripheral cylinder 12a, and a sinusoidal change appears as a result of sequentially changing the portion where the fixed magnetic pole 19a opposes the concavo-convexo shapes in accompaniment with the rotation of the first outer peripheral cylinder 12a.

In contrast, the output waveform of the magnetic sensor 15b becomes like the dotted-line waveform 20b. The output waveform 20b of the magnetic sensor 15b becomes a sine wave with the opposite phase of that of the output waveform 20a of the magnetic sensor 15a because the phases where the fixed magnetic pole 19c and the fixed magnetic pole 19a oppose the concavo-convexo shapes are mutually opposite phases. The average magnitude of the output waveform 20b of the magnetic sensor 15b also increases in accompaniment with an increase in the torque in the same manner as the output waveform 20a of the magnetic sensor 15a, but the increase in the torque is dependent on the fact that the magnitude of the detected magnetic flux passing through the magnetic sensor 15a linearly increases in accompaniment with an increase in the torque in the detection range between the angle positions θa and θb described in the first embodiment.

The chain line waveform 20c in FIG. 14 represents the average of the output waveform 20a of the magnetic sensor 15a and the output waveform 20b of the magnetic sensor 15b. The output waveforms 20a and 20b increase as a result in accompaniment with an increase in the torque along the waveform 20c. In this waveform 20c, the sinusoidal fluctuation component at the time of rotation arising due to the affect of the concavo-convexo shapes 23 on the end surface 22 of the first outer peripheral cylinder 12a is cancelled out because the output waveform 20a of the magnetic sensor 15a and the output waveform 20b of the magnetic sensor 15b are opposite phases. Consequently, the chain line waveform 20c obtained as the average of the output waveform 20a of the magnetic sensor 15a and the output waveform 20b of the magnetic sensor 15b is not affected by the concavo-convexo shapes 23 on the end surface 22 of the first outer peripheral cylinder 12a, and represents the change in the magnitude of the torsional torque working between the rotary shafts 1 and 2. The torsional torque applied to the rotary shafts 1 and 2 can be detected on the basis of this waveform 20c.

The two-dotted chain line waveform 20d in FIG. 14 represents half of the difference between the output waveform 20a of the magnetic sensor 15a and the output waveform 20b of the magnetic sensor 15b, and this changes sinusoidally along the horizontal axis. Because the magnitude of the torque working between the first rotary shaft 1 and the second rotary shaft 2 affects both the output of the magnetic sensor 15a and the output of the magnetic sensor 15b, the torque component is removed by calculating this difference. As for the fluctuation component at the time of rotation arising due to the affect of the concavo-convexo shapes 23 on the end surface 22 of the first outer peripheral cylinder 12a at the first rotary shaft 1 side, the output waveform 20a of the magnetic sensor 15a and the output waveform 20b of the magnetic sensor 15b are mutually opposite phases, so that by calculating the difference between them, the affect of the concavo-convexo shapes 23 on the end surface 22 of the first outer peripheral cylinder 12a remains in the waveform 20d and the rotation angle of the first outer peripheral cylinder 12a can be detected on the basis of this waveform 20d.

In the eighth embodiment shown in FIG. 13, the heights of the concavo-convexo shapes 23 on the end surface 22 of the first outer peripheral cylinder 12a are all uniform in the circumferential direction of the end surface 22, but it is also possible to detect the absolute angle by changing these heights in the circumferential direction. Further, three or more magnetic sensors may be used and the concavo-convexo shapes 23 on the end surface 22 of the first outer peripheral cylinder 12a may also be formed as a multistage. Further, the concavo-convexo shapes 23 may also be formed on the end surface where the second outer peripheral cylinder 12b opposes the first outer peripheral cylinder 12a. Moreover, means other than the concavo-convexo shapes 23 may also be used as long as the format is one where the magnetic resistance between the outer peripheral cylinders 12a and 12b and the fixed magnetic poles 19a, 19b, 19c and 19d changes. Further, the concavo-convexo shapes 23 may also be formed on the peripheral surfaces (e.g., the outer peripheral surfaces) of the outer peripheral cylinders 12a and 12b rather than on their end surfaces.

In this eighth embodiment, the two magnetic sensors 15a and 15b are used to determine the sum and difference of their output signals, and when one of the magnetic sensors fails, the detection signal of the other magnetic sensor is used so that the torque sensor can still be used although its performance becomes somewhat inferior. For this reason, the design of the torque sensor becomes redundant.

In this manner, the rotation angle can also be detected in addition to the torque by forming magnetic resistance changing portions such as the concavo-convexo shapes 23 on the first and second outer peripheral cylinders 12a and 12b. By using plural magnetic sensors, making opposite the phases where these face the concavo-convexo shapes 23, and calculating the sum or difference of the output signals of the plural magnetic sensors, a sensor that detects both the torque and the rotation angle can be realized at a low cost.

Ninth Embodiment

FIG. 15 is a side view showing a torque sensor according to a ninth embodiment of this invention. Concavo-convexo shapes 24 are formed in the circumferential direction on the end surface of the first outer peripheral cylinder 12a at the first rotary shaft 1 side, and the rotation angle is detected using rotation angle detecting means 21 opposing the concavo-convexo shapes 24. The rotation angle detecting means 21 is, for example, an eddy current type displacement sensor. The remaining construction is the same as that of the fifth embodiment.

INDUSTRIAL APPLICABILITY

The torque sensor according to this invention is used to detect the steering torque of the steering wheel of an automobile, for example, but it can also be applied for other purposes as long as the purpose is detecting torque.

BRIEF DESCRIPTION OF THE DRAWINGS

FIG. 1 Show a first embodiment of a torque sensor according to this invention, with FIG. 1(a) being a front view where some parts are omitted and FIG. 1(b) being a cross-sectional view in a plane including a common axial line.

Figure 2:
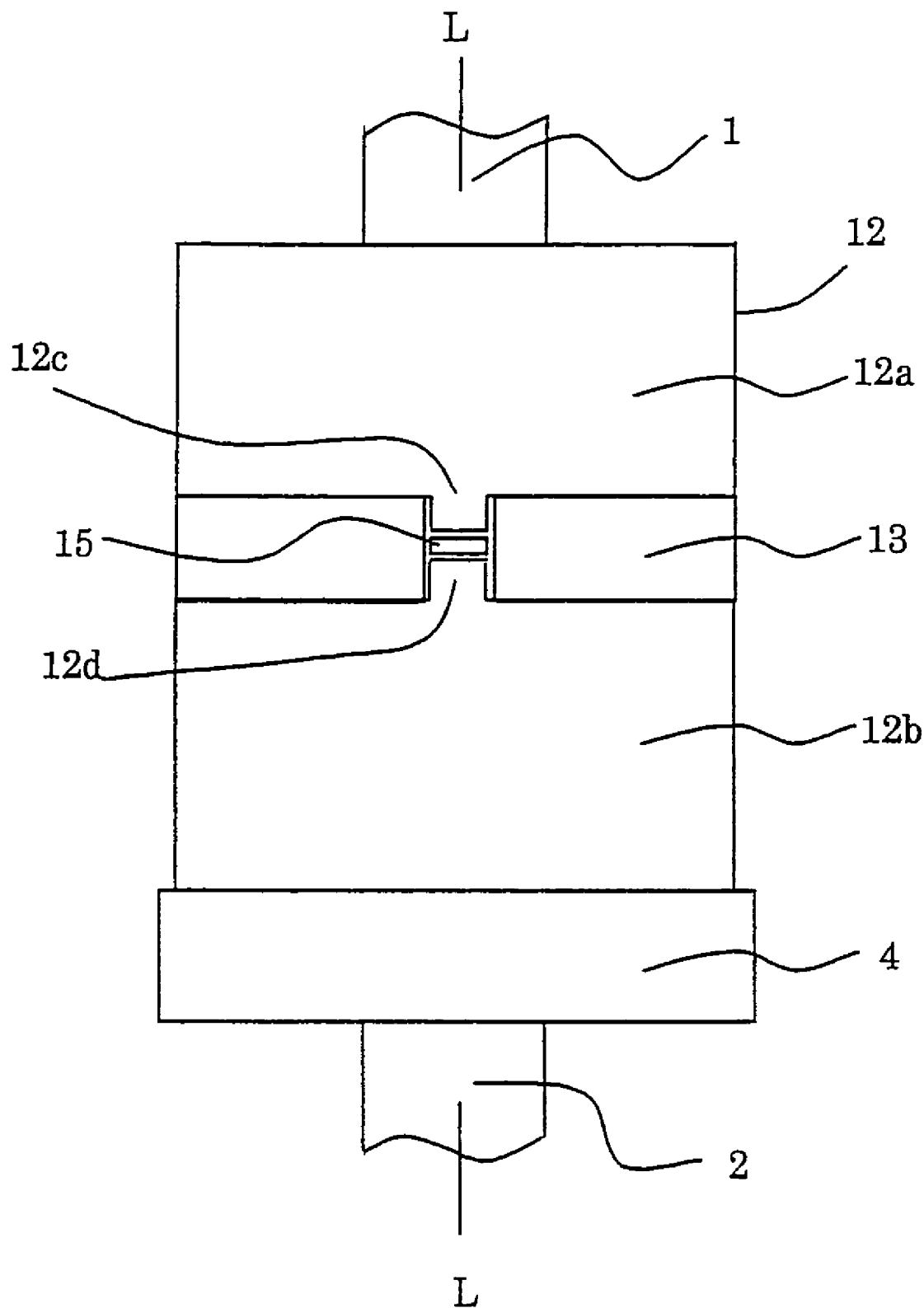
FIG. 2 A side view of the torque sensor of the first embodiment.
Figure 3:
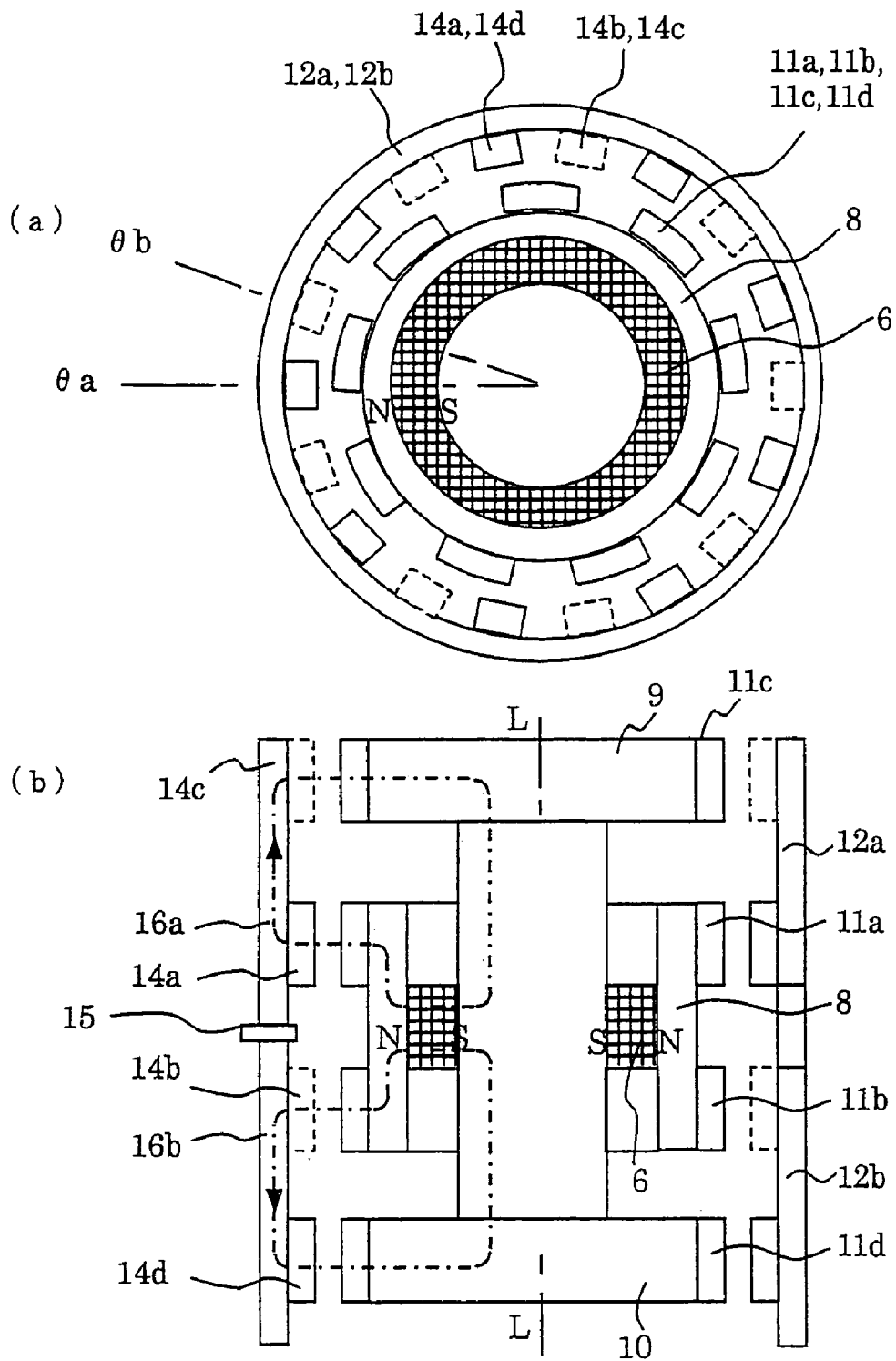
FIG. 3 Show a state in an origin position of the torque sensor of the first embodiment, with FIG. 3(a) being a front view where some parts are omitted and FIG. 3(b) being a cross-sectional view in a plane including the common axial line.
Figure 4:
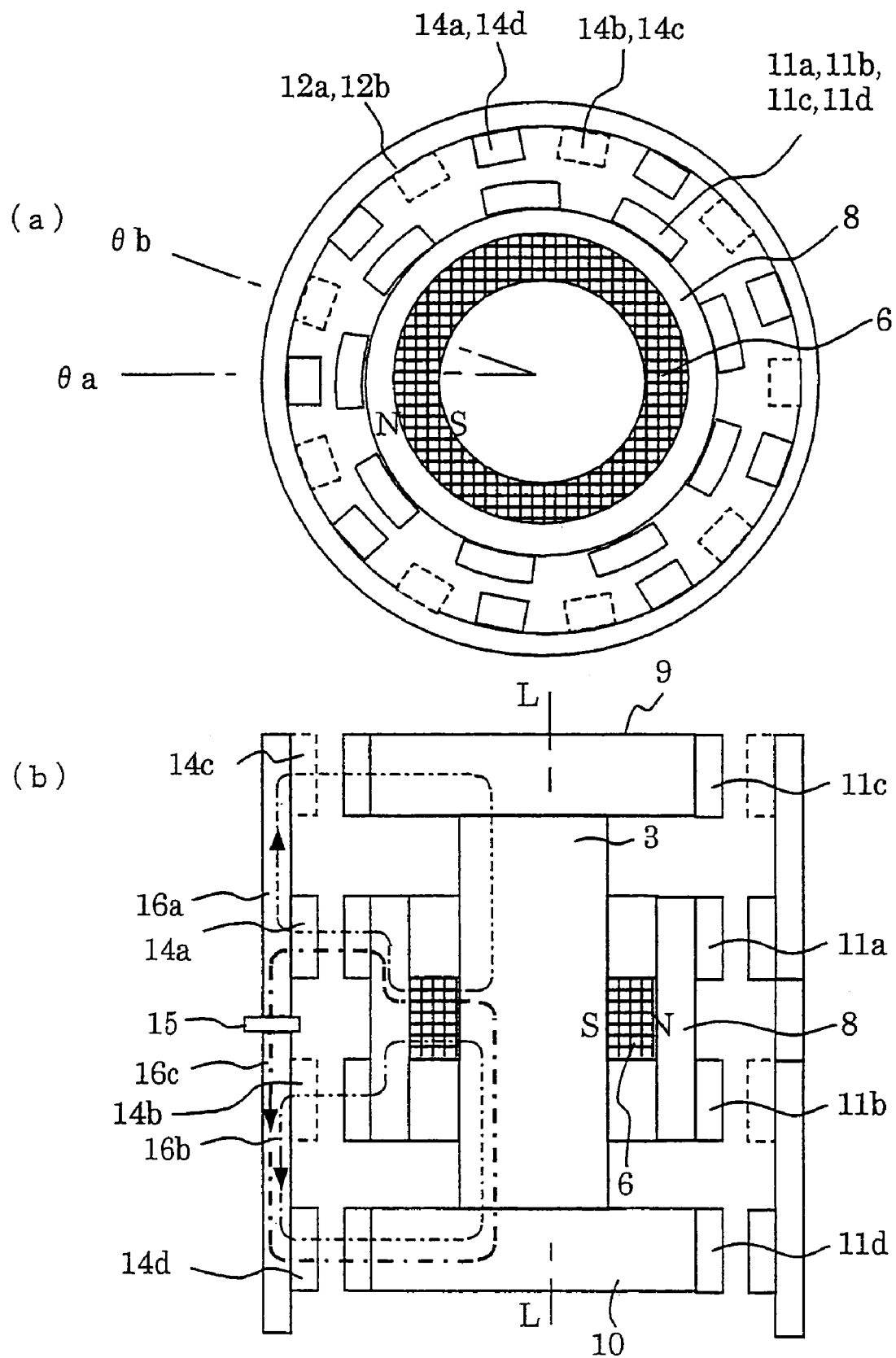
FIG. 4 Show a state in a first torque range of the first embodiment, with FIG. 4(a) being a front view where some parts are omitted and FIG. 4(b) being a cross-sectional view in a plane including the common axial line.
Figure 5:
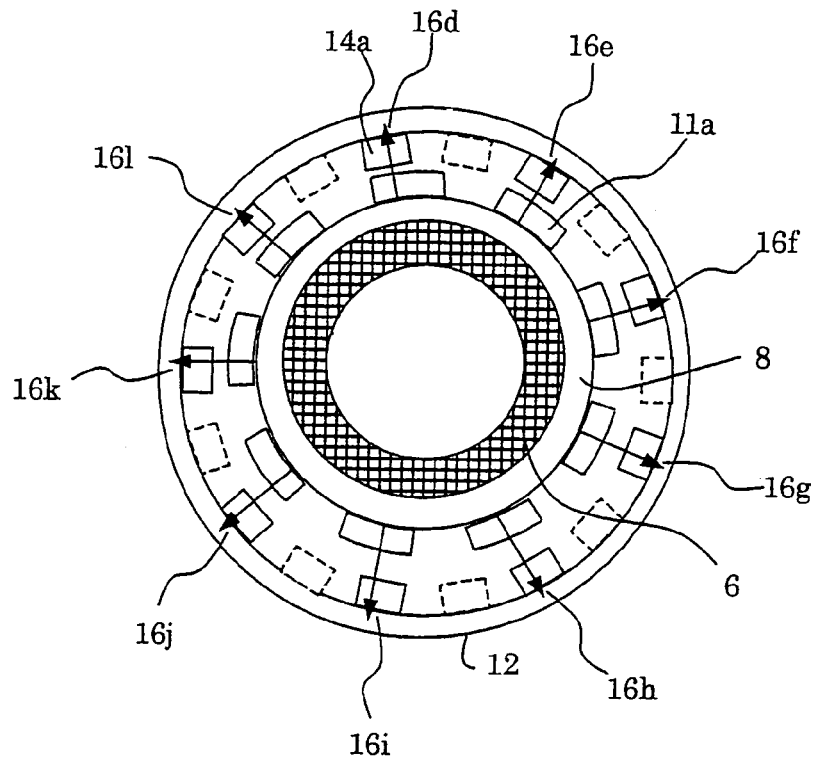
FIG. 5 A cross-sectional view showing the flow of magnetic fluxes when an axial line of first and second rotary shafts has shifted in the torque sensor of the first embodiment.
Figure 6:
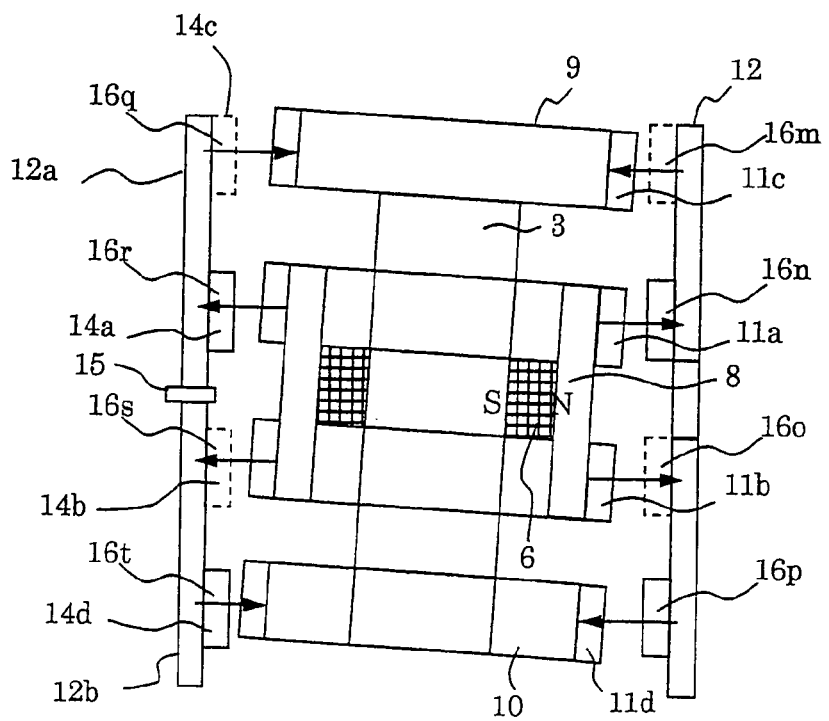
FIG. 6 A cross-sectional view showing the flow of magnetic fluxes when the first and second rotary shafts are slanted in the torque sensor of the first embodiment.
Figure 7:
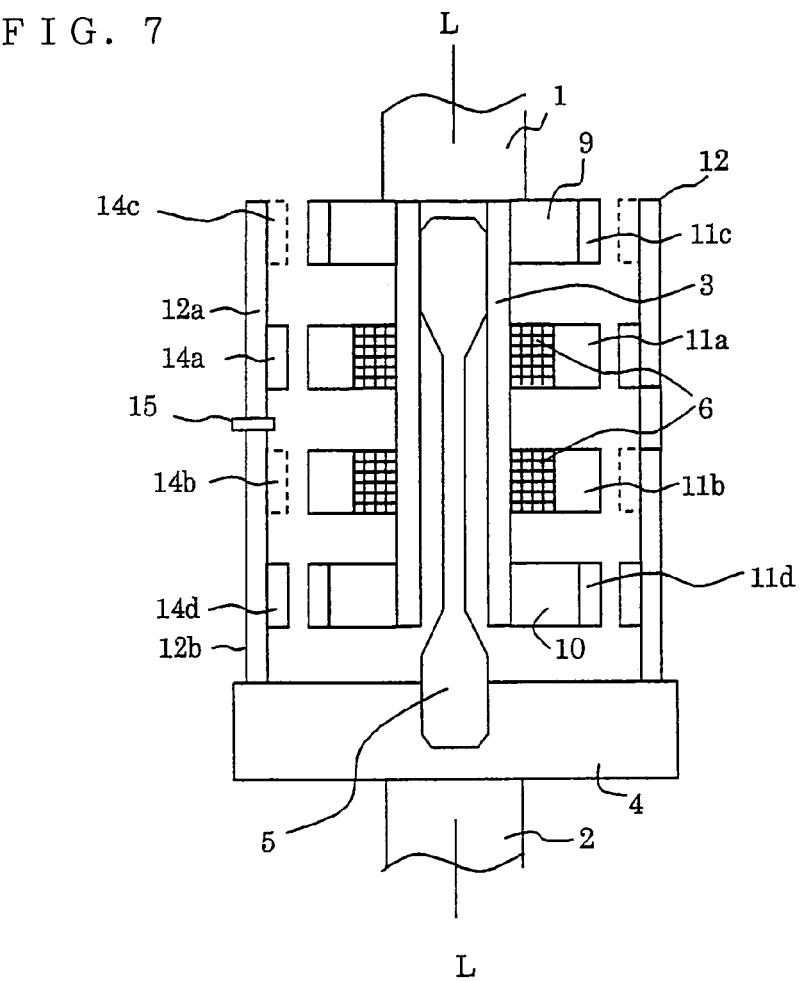
FIG. 7 A cross-sectional view where a torque sensor according to a second embodiment of this invention is cross-sectioned by a plane including the common axial line.
Figure 8:
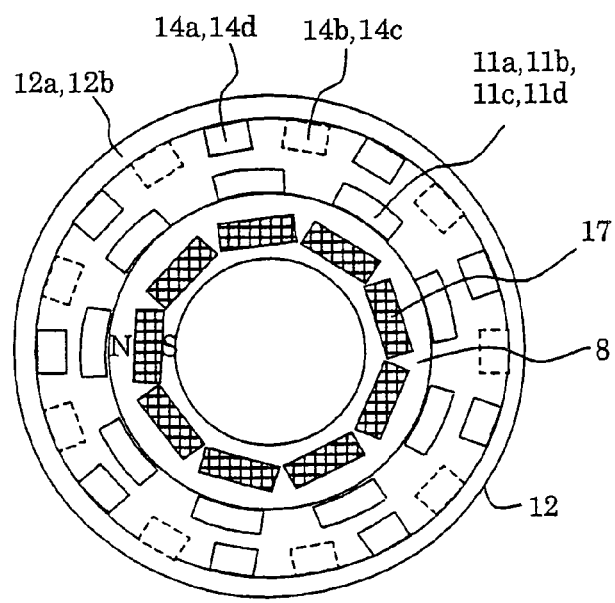
FIG. 8 A cross-sectional view showing a torque sensor according to a third embodiment of this invention, with some parts being omitted.
Figure 9:
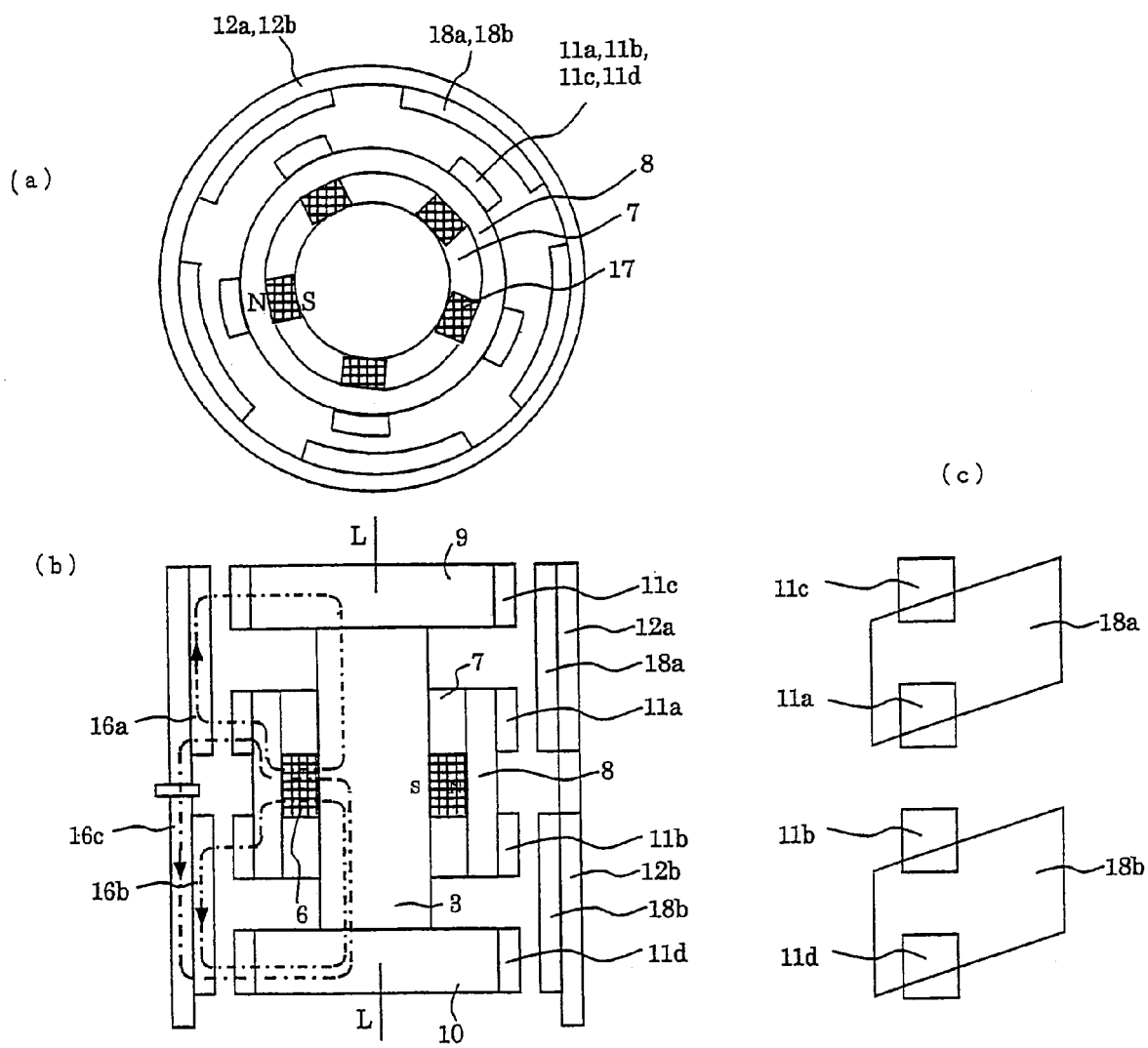
FIG. 9 Show a fourth embodiment of the torque sensor according to this invention, with FIG. 9(a) being a front view where some parts are omitted, FIG. 9(b) being a cross-sectional view in a plane including the common axial line, and FIG. 9(c) being a developed view showing the relationship between inner peripheral magnetic poles and beveled magnetic pole plates.
Figure 10:
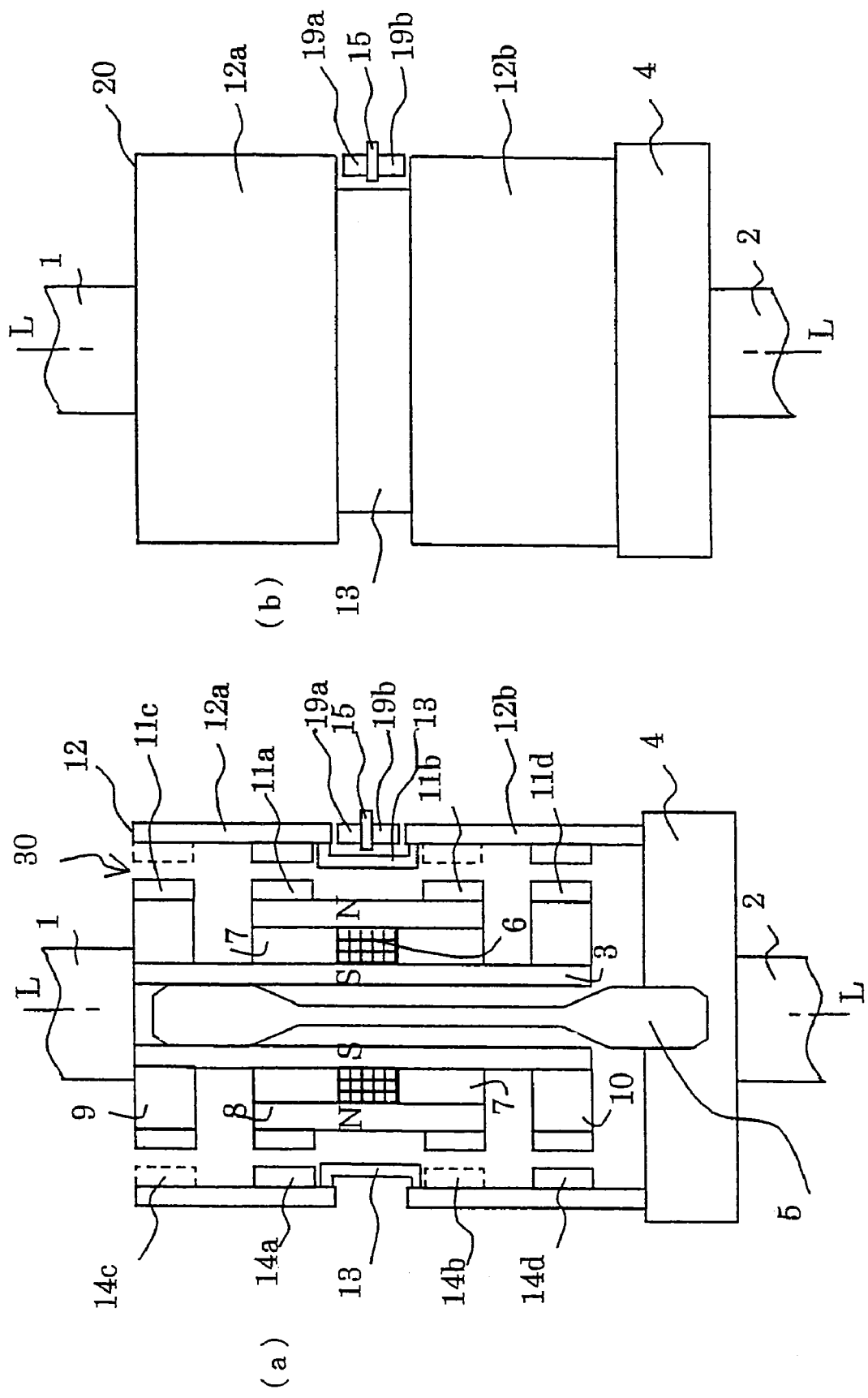
FIG. 10 Show a fifth embodiment of the torque sensor according to this invention, with FIG. 10(a) being a cross-sectional view in a plane including the common axial line and FIG. 10(b) being a side view.
Figure 11:
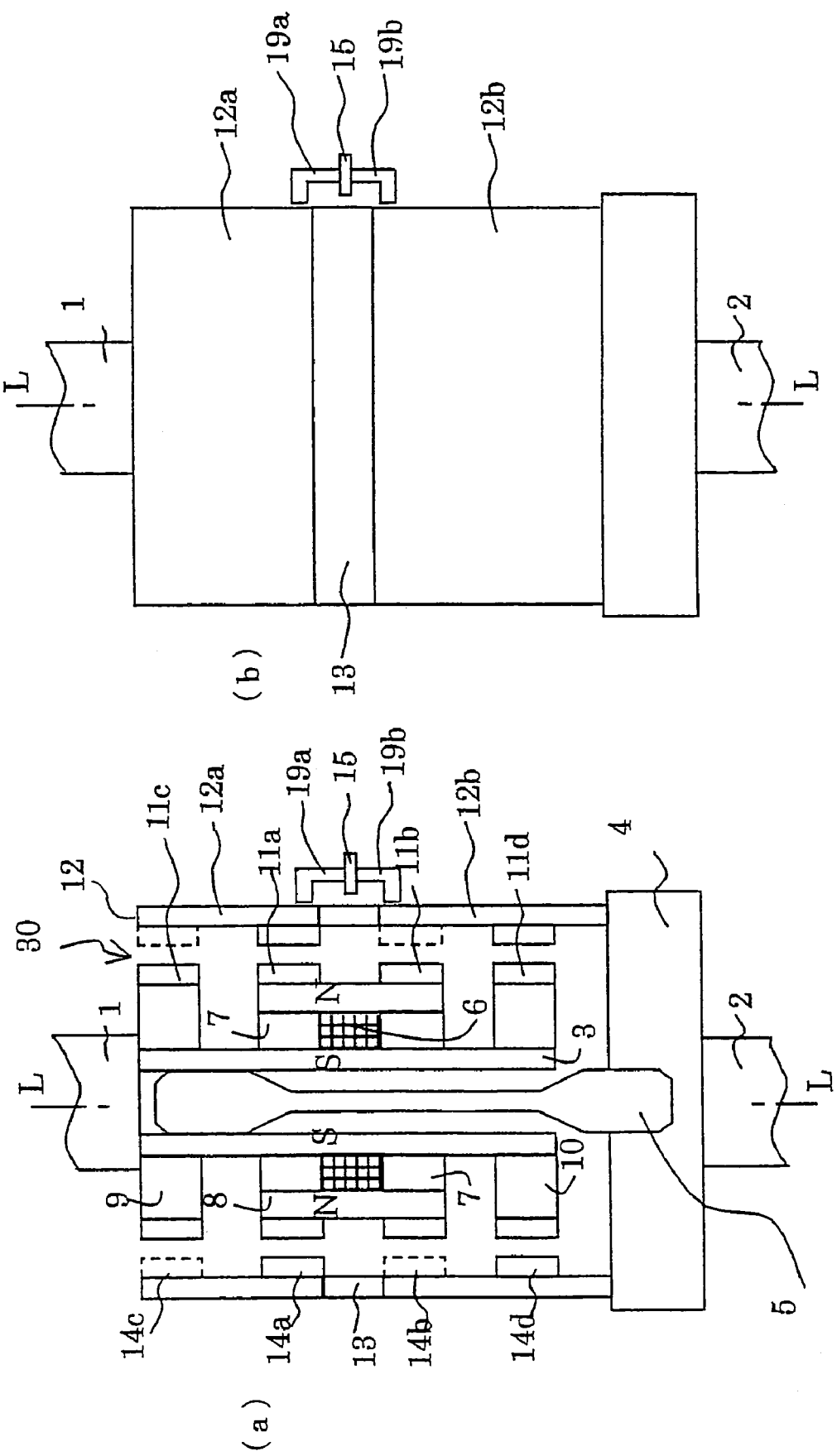
FIG. 11 Show a sixth embodiment of the torque sensor according to this invention, with FIG. 11(a) being a cross-sectional view in a plane including the common axial line and FIG. 11(b) being a side view.
Figure 12:
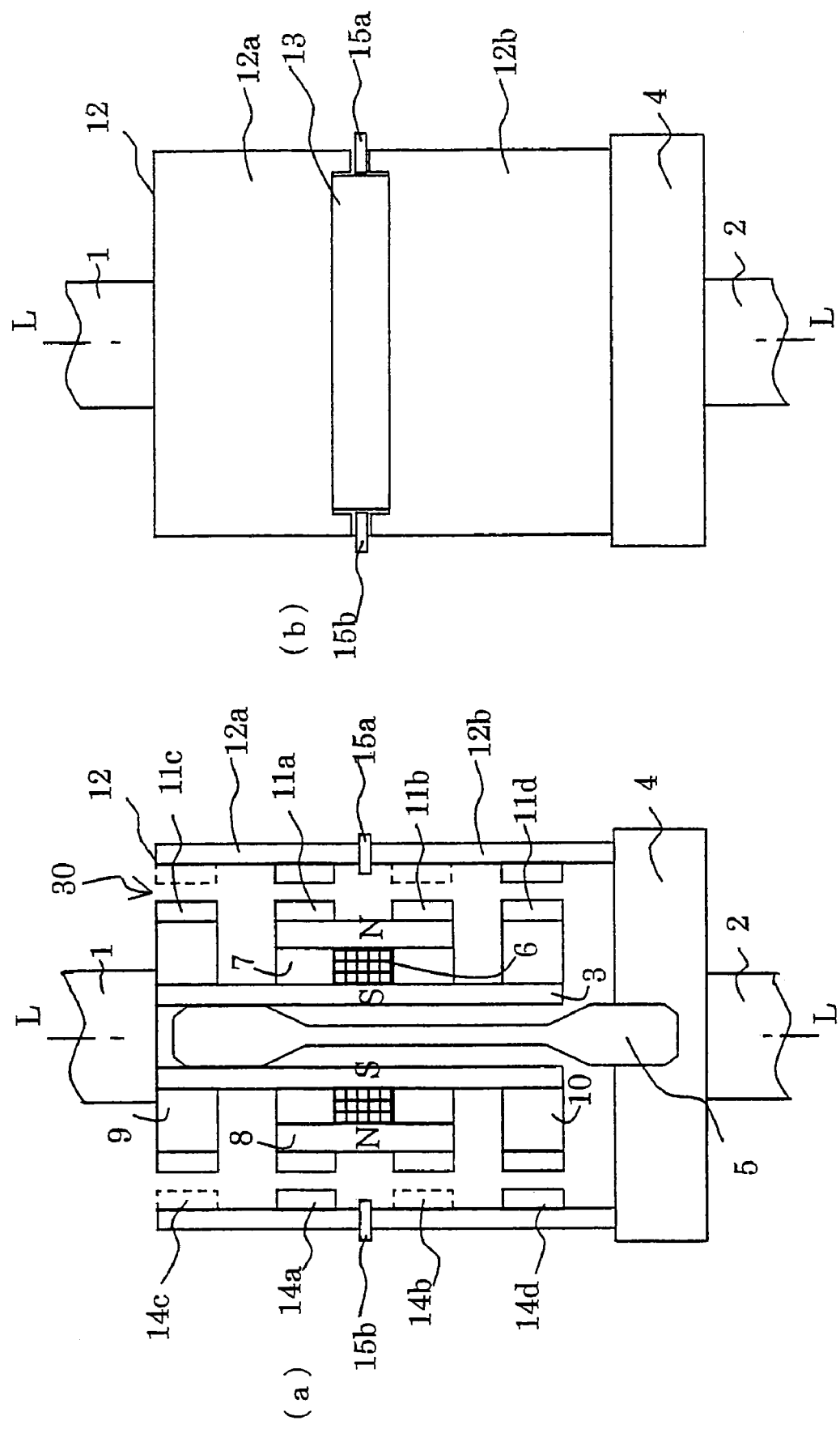
FIG. 12 Show a seventh embodiment of the torque sensor according to this invention, with FIG. 12(a) being a cross-sectional view in a plane including the common axial line and FIG. 12(b) being a side view.
Figure 13:
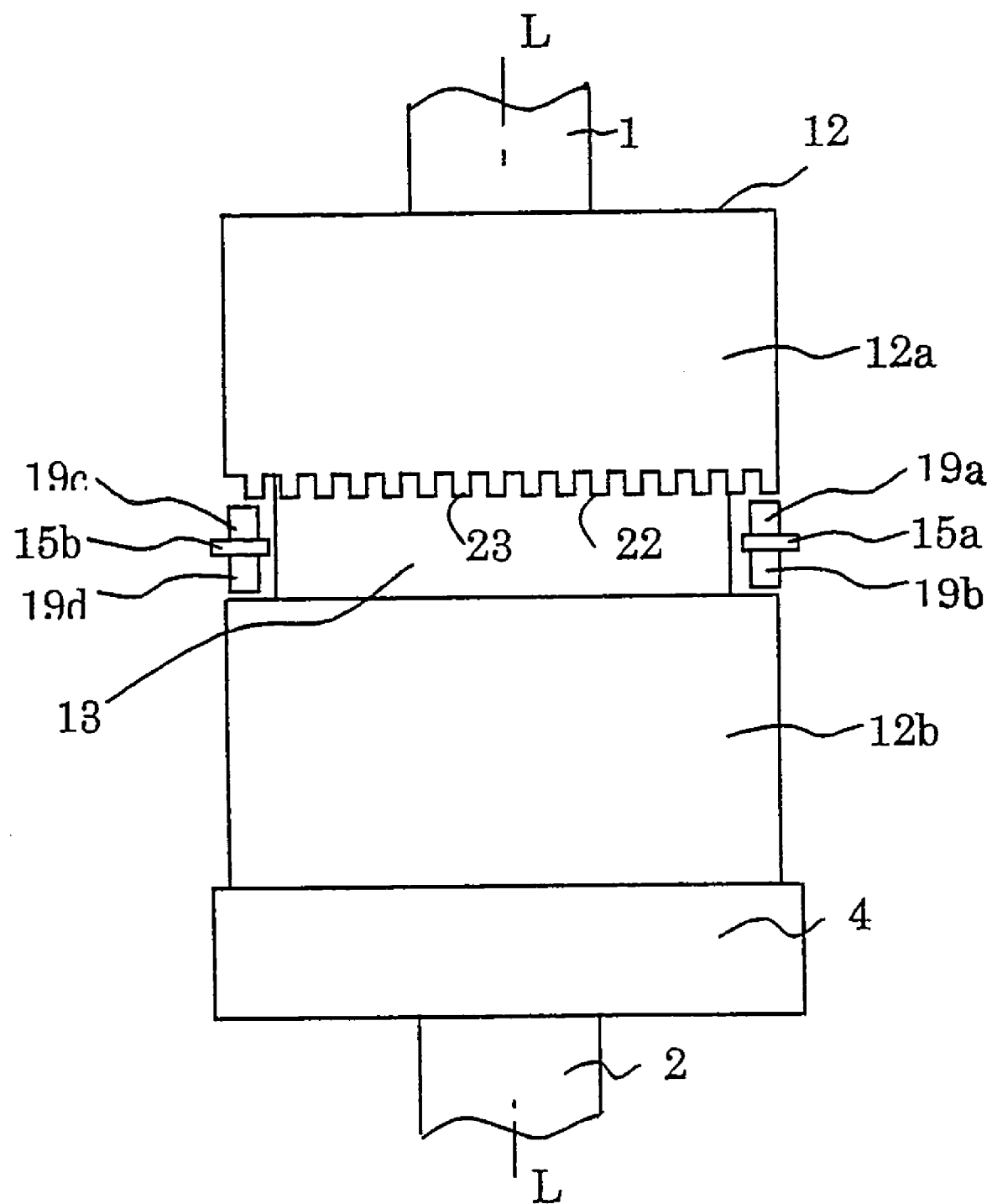
FIG. 13 A side view showing an eighth embodiment of the torque sensor according to this invention.
Figure 14:
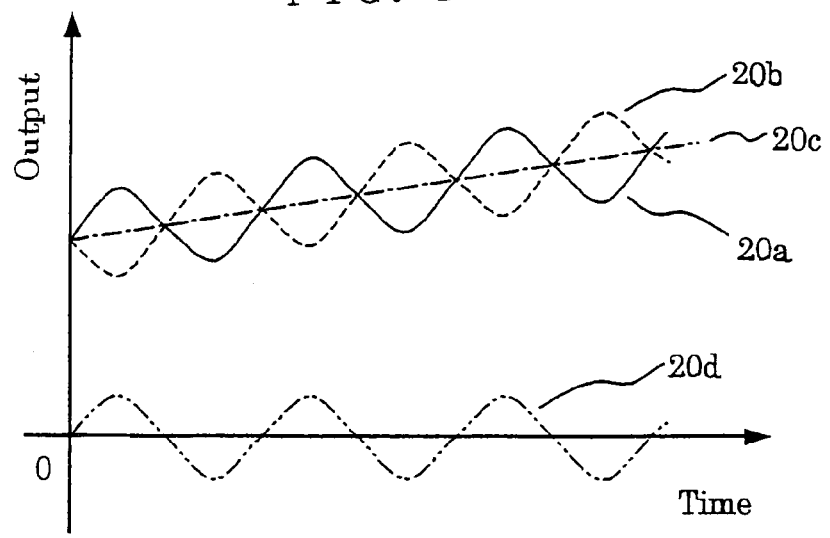
FIG. 14 A characteristic diagram showing the output waveforms of magnetic sensors in the eighth embodiment.
Figure 15:
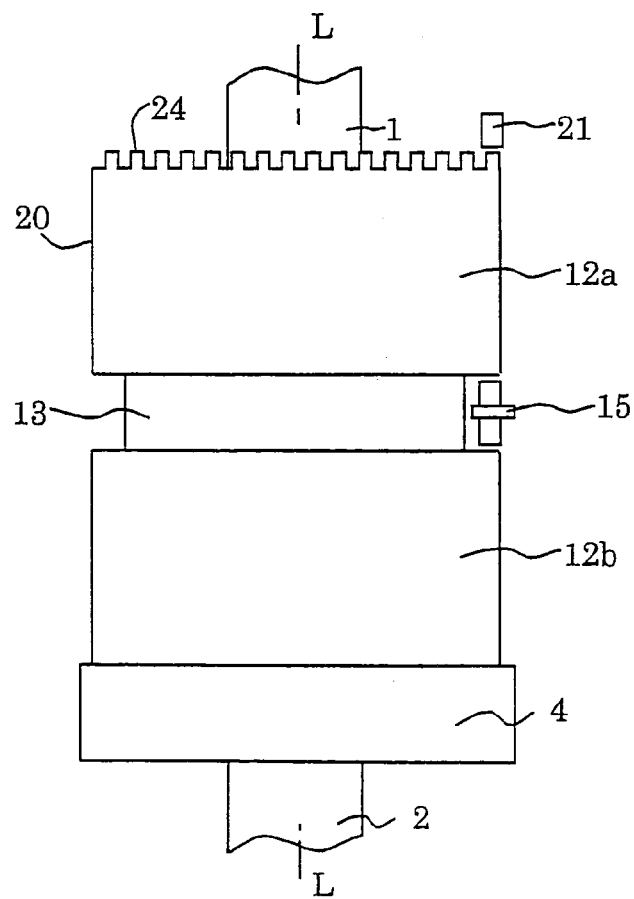
FIG. 15 A side view showing the ninth embodiment of the torque sensor according to this invention.

The invention claimed is:

1. A torque sensor where a first rotary shaft and a second rotary shaft are disposed on a common axial line, with the first rotary shaft and the second rotary shaft being coupled together by a torsion bar, and which detects torsional torque applied between the first rotary shaft and the second rotary shaft, the torque sensor comprising:

magnetic field generating means disposed in a center area along the common axial line, the magnetic field generating means includes at least one permanent magnet magnetized in a radial direction around the common axial line, the magnetic field generating means generating a magnetic field in the radial direction around the common axial line;

magnetic field varying means that includes first, second, third, and fourth magnetic field varying components and two outer peripheral cylinders of magnetic material, where the first and second magnetic field varying components are disposed in the center area to surround the magnetic field generating means, the third and fourth magnetic field varying components are disposed in adjoining areas to the center area, and said magnetic field varying means varying a relative direction and magnitude of a detection portion of magnetic flux from the magnetic field generating means flowing between the outer peripheral cylinders along an axis parallel to the common axial line in response to the relative rotation between the first rotary shaft and the second rotary shaft; and magnetic sensor means that detects the detection portion of magnetic flux, wherein the magnetic sensor means generates an output signal whose polarity changes in response to the relative direction of the detection portion of magnetic flux and whose magnitude changes in response to the magnitude of the detection portion of magnetic flux.

2. The torque sensor of claim 1, wherein the magnetic field generating means comprises at least one ring-shaped permanent magnet disposed around the common axial line, and the permanent magnet is magnetized in the radial direction around the common axial line.

3. The torque sensor of claim 1, wherein the magnetic field generating means comprises plural permanent magnet plates disposed around the common axial line, and the magnetic field is generated by these permanent magnet plates.

4. The torque sensor of claim 1, wherein the magnetic sensor means includes first and second magnetic sensors, wherein when each of these magnetic sensors detects the detection portion of magnetic flux, the output of the first magnetic sensor includes a first signal component that periodically changes in accompaniment with the rotation of the second rotary shaft, and the output of the second magnetic sensor includes a second signal component of the opposite phase of the first signal component in accompaniment with the rotation of the second rotary shaft.

5. The torque sensor of claim 1, wherein the magnetic sensor means is disposed between the outer peripheral cylinders along the axis parallel to the common axial line such that the detection portion of magnetic flux passes directly through the magnetic sensor means.

6. A torque sensor where a first rotary shaft and a second rotary shaft are disposed on a common axial line, with the first rotary shaft and the second rotary shaft being coupled together by a torsion bar, and which detects torsional torque applied between the first rotary shaft and the second rotary shaft, the torque sensor comprising:
magnetic field generating means that generates a magnetic field in the radial direction around the common axial line;
magnetic field varying means that varies, in response to the relative rotation between the first rotary shaft and the second rotary shaft, the direction and magnitude of detected magnetic flux flowing along the common axial line from the magnetic field generating means;
an outer peripheral cylinder that rotates together with the second rotary shaft, wherein the magnetic field varying means includes plural magnetic field varying means, and these plural magnetic field varying means are disposed along the common axial line on an inner periphery of the outer peripheral cylinder; and
magnetic sensor means that detects the detected magnetic flux,
wherein the magnetic sensor means generates an output signal whose polarity changes in response to the direction of the detected magnetic flux and whose magnitude changes in response to the magnitude of the detected magnetic flux,
wherein the outer peripheral cylinder includes a first outer peripheral cylinder and a second outer peripheral cylinder disposed along the common axial line, the first outer peripheral cylinder and the second outer peripheral cylinder are constructed such that the detected magnetic flux flows between them, and the magnetic sensor means is disposed such that the detected magnetic flux passes through, and
wherein a first magnetic field varying means and a third magnetic field varying means are disposed on an inner periphery of the first outer peripheral cylinder, and a second magnetic field varying means and a fourth magnetic field varying means are disposed on an inner periphery of second outer peripheral cylinder.

7. The torque sensor of claim 6, wherein
each of the first, second, third and fourth magnetic field varying means includes inner peripheral magnetic poles that rotate together with the first rotary shaft and outer peripheral magnetic poles that oppose the inner peripheral magnetic poles,
the outer peripheral magnetic poles of the first and third magnetic field varying means are disposed on an inner peripheral surface of the first outer peripheral cylinder, and
the outer peripheral magnetic poles of the second and fourth magnetic field varying means are disposed on an inner peripheral surface of the second outer peripheral cylinder.

8. The torque sensor of claim 6, wherein
first beveled magnetic pole plates and second beveled magnetic pole plates that extend in a direction beveled a predetermined angle with respect to the common axial line are disposed on the inner peripheries of the first outer peripheral cylinder and the second outer peripheral cylinder,
the first magnetic field varying means and the third magnetic field varying means are constructed using the first beveled magnetic pole plates, and
the second magnetic field varying means and the fourth magnetic field varying means are constructed using the second beveled magnetic pole plates.

9. The torque sensor of claim 5, wherein the magnetic sensor means is fixed such that it does not move even if the outer peripheral cylinders rotate.

10. The torque sensor of claim 1, wherein the magnetic sensor means includes first and second magnetic sensors, each of these magnetic sensors detects the detection portion of magnetic flux and generates an output signal whose polarity changes in response to the relative direction of the detection portion of magnetic flux and whose magnitude changes in response to the magnitude of the detection portion of magnetic flux.

11. The torque sensor of claim 1, wherein the torque sensor also detects, in addition to the torsional torque, the rotation angle of the second rotary shaft on the basis of the output signal of the magnetic sensor means.

12. The torque sensor of claim 1, further comprising rotation angle detecting means that detects the rotation angle of the second rotary shaft.

13. A torque sensor where a first rotary shaft and a second rotary shaft are disposed on a common axial line, with the first rotary shaft and the second rotary shaft being coupled together by a torsion bar, and which detects torsional torque applied between the first rotary shaft and the second rotary shaft, the torque sensor comprising:
a magnetic configured to generate a magnetic field in a radial direction around the common axial line;
magnetic field varying means that includes first, second, third, and fourth magnetic field varying components disposed along the common axial line;
first and second outer peripheral cylinders of magnetic material, said first outer peripheral cylinder is disposed to surround the first and third magnetic field varying components, said second outer peripheral cylinder is disposed to surround the second and fourth magnetic field varying components, said first and second outer peripheral cylinders being configured so as to vary a relative direction and magnitude of a detection portion of magnetic flux from the magnetic flowing between the first and second outer peripheral cylinders along an axis parallel to the common axial line in response to the relative rotation between the first rotary shaft and the second rotary shaft; and a magnetic sensor configured to detect the detection portion of magnetic flux, wherein the magnetic sensor is further configured to generate an output signal whose polarity changes in response to the relative direction of the detection portion of magnetic flux and whose magnitude changes in response to the magnitude of the detection portion of magnetic flux.

14. The torque sensor of claim 13, wherein the magnetic sensor is disposed between the first outer peripheral cylinder and the second outer peripheral cylinder along the axis parallel to the common axial line such that the detection portion of magnetic flux passes directly through the magnetic sensor.

15. The torque sensor of claim 13, wherein each of the first, second, third, and fourth magnetic field varying components includes an inner peripheral magnetic pole rotated together with the first rotary shaft and an outer magnetic pole rotated together with the first and second outer peripheral cylinders, the outer peripheral magnetic poles of the first and third magnetic field varying components being disposed on an inner peripheral surface of the first outer peripheral cylinder, and the outer peripheral magnetic poles of the second and fourth magnetic field varying components being disposed on an inner peripheral surface of the second outer peripheral cylinder.

16. The torque sensor of claim 13, wherein one of the first outer peripheral cylinder and the second outer peripheral cylinder includes concave portions and convex portions in one end thereof.

* * * * *